(12) United States Patent
Yamaguchi et al.

(10) Patent No.: US 12,507,893 B2
(45) Date of Patent: Dec. 30, 2025

(54) BRAIN FUNCTION MEASUREMENT DEVICE

(71) Applicant: SHIMADZU CORPORATION, Kyoto (JP)

(72) Inventors: Shumpei Yamaguchi, Kyoto (JP); Akihiro Ishikawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 943 days.

(21) Appl. No.: 17/427,163

(22) PCT Filed: Dec. 23, 2019

(86) PCT No.: PCT/JP2019/050294
§ 371 (c)(1),
(2) Date: Jul. 30, 2021

(87) PCT Pub. No.: WO2020/162063
PCT Pub. Date: Aug. 13, 2020

(65) Prior Publication Data
US 2022/0095921 A1    Mar. 31, 2022

(30) Foreign Application Priority Data

Feb. 8, 2019 (JP) .................................. 2019-021925

(51) Int. Cl.
*A61B 5/00* (2006.01)
*A61B 5/026* (2006.01)
*A61B 5/055* (2006.01)

(52) U.S. Cl.
CPC .......... *A61B 5/0042* (2013.01); *A61B 5/0263* (2013.01); *A61B 5/055* (2013.01); *A61B 5/743* (2013.01)

(58) Field of Classification Search
CPC ..... A61B 5/055; A61B 5/4064; A61B 5/0042; A61B 2576/026; A61B 5/7246;
(Continued)

(56) References Cited

U.S. PATENT DOCUMENTS 10,588,561 B1 * 3/2020 Vale ...................... A61B 5/0042
2011/0301431 A1 * 12/2011 Greicius ............... G06T 7/0012
600/300
(Continued)

FOREIGN PATENT DOCUMENTS

| JP | 2015-116213 A | 6/2015 |
| JP | 6195329 B1 | 9/2017 |
| JP | 6492356 B2 * | 4/2019 |

OTHER PUBLICATIONS

Takakura, H., Nishijo, H., Ishikawa, A., & Shojaku, H. (2015). Cerebral hemodynamic responses during dynamic posturography: analysis with a multichannel near-infrared spectroscopy system. Frontiers in human neuroscience, 9, 620. (Year: 2015).*
(Continued)

*Primary Examiner* — Keith M Raymond
*Assistant Examiner* — Johnathan Maynard
(74) *Attorney, Agent, or Firm* — Sughrue Mion, PLLC

(57) ABSTRACT

This brain function measurement device (100) includes a brain blood flow information acquisition unit (1) that acquires brain blood flow information (d1) of a subject (P), a brain function information acquisition unit (30) that acquires brain function correlation information (d3) indicating a relative change in a correlation between respective portions of the brain acquired on the basis of the brain blood flow information measured in a plurality of portions of a brain before and after a task is presented, and a brain function image generation unit (7) that generates a first brain function image (20) in which a relative position of each measurement position (23) for the brain blood flow infor-
(Continued)

mation and the measurement position at which the correlation acquired on the basis of the brain function correlation information has changed are visually recognizable.

16 Claims, 13 Drawing Sheets

(58) Field of Classification Search
CPC ..... A61B 5/0075; A61B 5/14553; A61B 5/02; A61B 5/145; A61B 5/03; A61B 5/0261; A61B 5/0059; A61B 5/0263; A61B 5/743; A61B 5/0073; A61B 10/00; G01R 33/4806; G01R 33/4808; G06T 2207/10088; G06T 2207/30016; G06T 7/0012; G16H 30/40; G16H 50/20

See application file for complete search history.

(56) References Cited

U.S. PATENT DOCUMENTS

| | | | | |
|---|---|---|---|---|
| 2015/0105672 | A1* | 4/2015 | Ishikawa | A61B 5/14553 600/479 |
| 2015/0294074 | A1* | 10/2015 | Kawato | A61B 5/375 702/19 |
| 2020/0008725 | A1* | 1/2020 | Bach | A61B 5/16 |
| 2020/0104984 | A1* | 4/2020 | Xing | G16H 50/20 |
| 2020/0163609 | A1 | 5/2020 | Lisi et al. | |

OTHER PUBLICATIONS

Mihara, M., & Miyai, I. (2016). Review of functional near-infrared spectroscopy in neurorehabilitation. Neurophotonics, 3(3), 031414-031414. (Year: 2016).*

Tak, S. (2011). NIRS SPM: Statistical Parametric Mapping for Near infrared Spectroscopy Version 4 User's Guide. Bio Imaging Signal Processing (BISP) Lab. Dept. of Bio and Brain Engineering, KAIST. (Year: 2011).*

Rosenbaum, D., Hagen, K., Deppermann, S., Kroczek, A. M., Haeussinger, F. B., Heinzel, S., . . . & Trend Study Consortium. (2016). State-dependent altered connectivity in late-life depression: a functional near-infrared spectroscopy study. Neurobiology of aging, 39, 57-68. (Year: 2016).*

Shi, J., Sakatani, K., Okamoto, M., Yamaguchi, Y., & Zuo, H. C. (2014). Correlation between LIFG and autonomic activation during stressful tasks: a functional near-infrared spectroscopy (fNIRS) study. Journal of Huazhong University of Science and Technology [Medical Sciences], 34(5), 663-671. (Year: 2014).*

Okamoto, M., Dan, H., Clowney, L., Yamaguchi, Y., & Dan, I. (2009). Activation in ventro-lateral prefrontal cortex during the act of tasting: an fNIRS study. Neuroscience letters, 451(2), 129-133. (Year: 2009).*

Okamoto, M., Wada, Y., Yamaguchi, Y., Kyutoku, Y., Clowney, L., Singh, A. K., & Dan, I. (2011). Process-specific prefrontal contributions to episodic encoding and retrieval of tastes: a functional NIRS study. Neuroimage, 54(2), 1578-1588. (Year: 2011).*

Okamoto, M., Matsunami, M., Dan, H., Kohata, T., Kohyama, K., & Dan, I. (2006). Prefrontal activity during taste encoding: an fNIRS study. Neuroimage, 31(2), 796-806. (Year: 2006).*

Okamoto, M., Dan, H., Shimizu, K., Takeo, K., Amita, T., Oda, I., . . . & Dan, I. (2004). Multimodal assessment of cortical activation during apple peeling by NIRS and fMRI. Neuroimage, 21(4), 1275-1288. (Year: 2004).*

Okamoto, M., Tsuzuki, D., Clowney, L., Dan, H., Singh, A. K., & Dan, I. (2009). Structural atlas-based spatial registration for functional near-infrared spectroscopy enabling inter-study data integration. Clinical Neurophysiology, 120(7), 1320-1328. (Year: 2009).*

Notice of Reasons for Refusal dated Apr. 5, 2022 from the Japanese Patent Office in JP Application No. 2020-571033.

Office Action issued Sep. 13, 2022 in Japanese Application No. 2020-571033.

Kathryn Y. Manning, et al., "Multiparametric MRI changes persist beyond recovery in concussed adolescent hockey players", Neurology, Nov. 21, 2017, pp. 2157-2166, vol. 89, No. 21.

David Rosenbaum, et al., "State-dependent altered connectivity in late-life depression: a functional near-infrared spectroscopy study", Neurobiology of Aging, Mar. 2016, pp. 57-68, vol. 39.

Ziyan Wu, et al., "Altered cortical activation and connectivity patterns for visual attention processing in young adults post-traumatic brain injury: A functional near infrared spectroscopy study", CNS Neuroscience & Therapeutics, Jun. 2018, pp. 539-548, vol. 24, No. 6.

International Search Report for PCT/JP2019/050294 dated Mar. 3, 2020 (PCT/ISA/210).

Written Opinion for PCT/JP2019/050294 dated Mar. 3, 2020 (PCT/ISA/237).

Decision of Refusal dated Apr. 11, 2023 from the Japanese Patent Office in Application No. 2020-571033.

Chinese Office Action dated Jun. 1, 2023 in Application No. 201980090986.7.

* cited by examiner

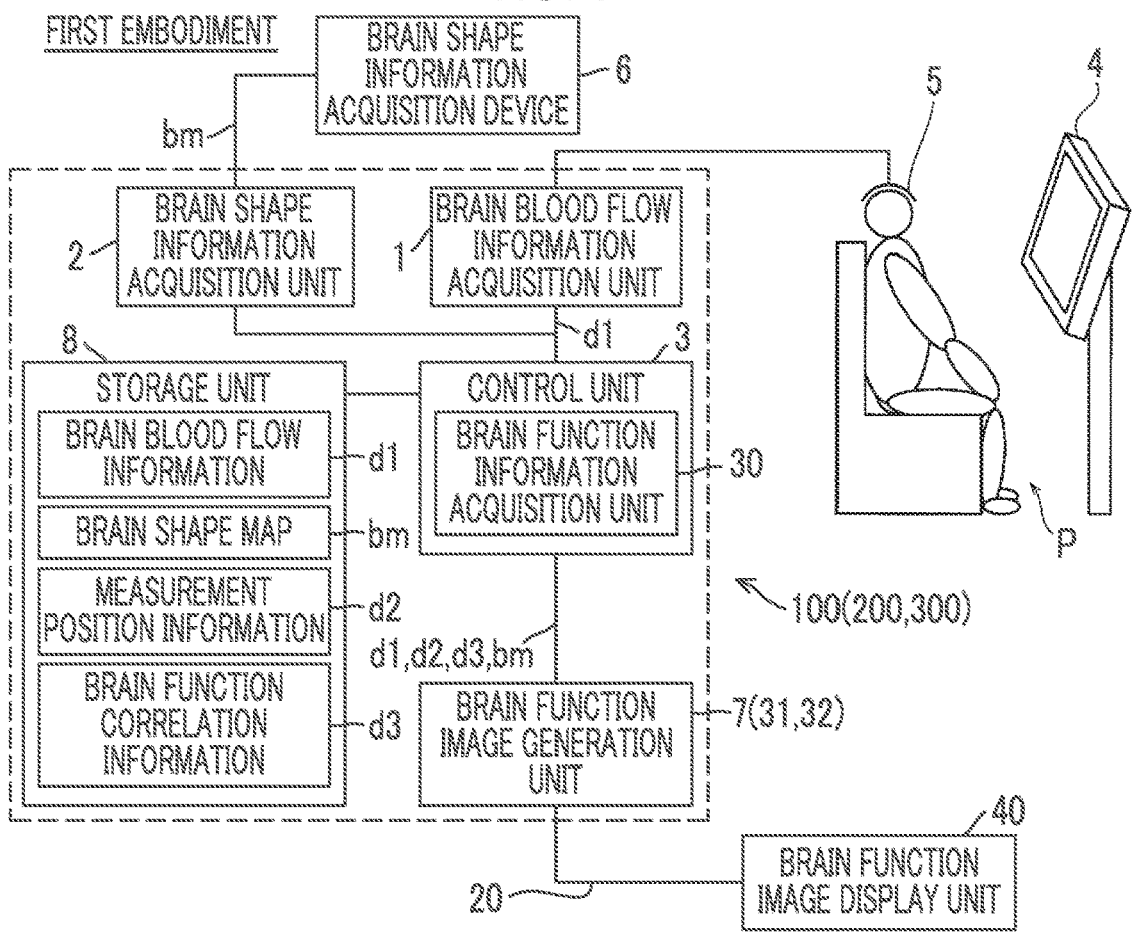
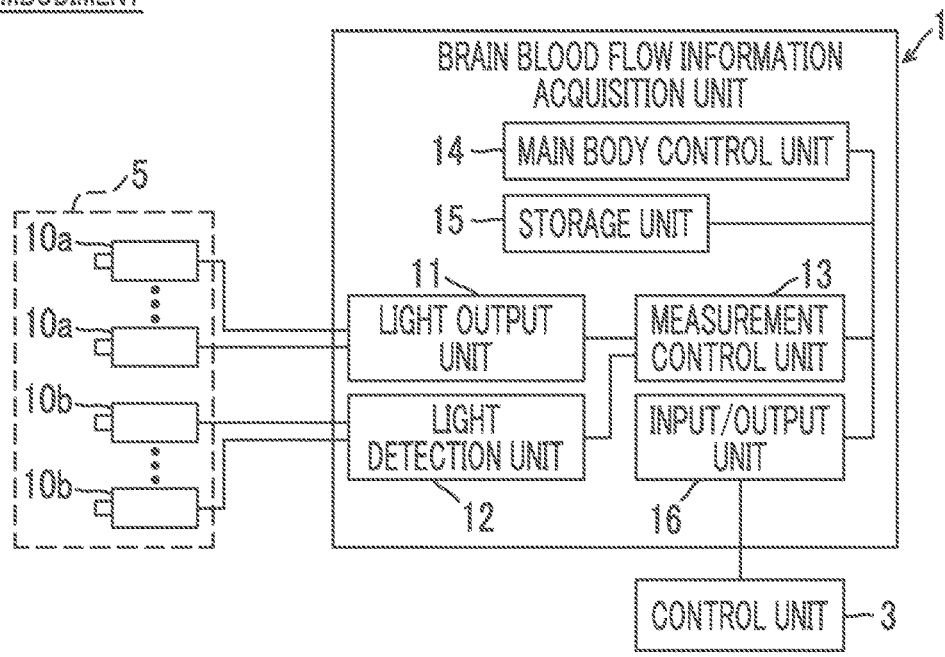

FIG. 9
SECOND EMBODIMENT
(A) FIRST BRAIN FUNCTION IMAGE
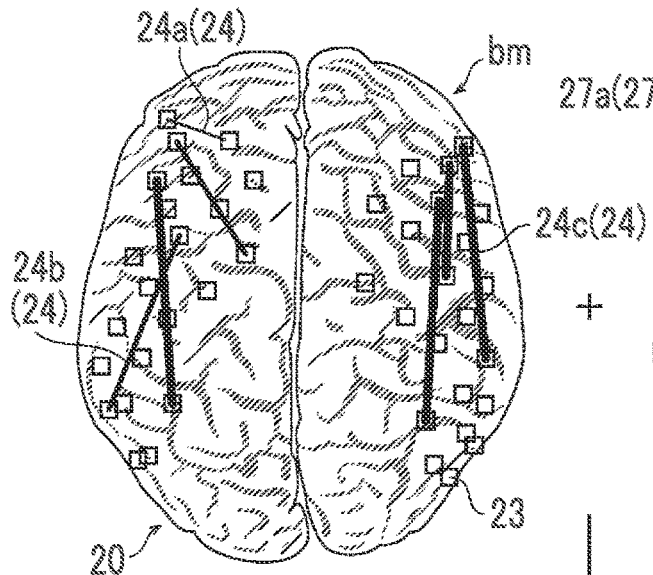
(B) SECOND BRAIN FUNCTION IMAGE
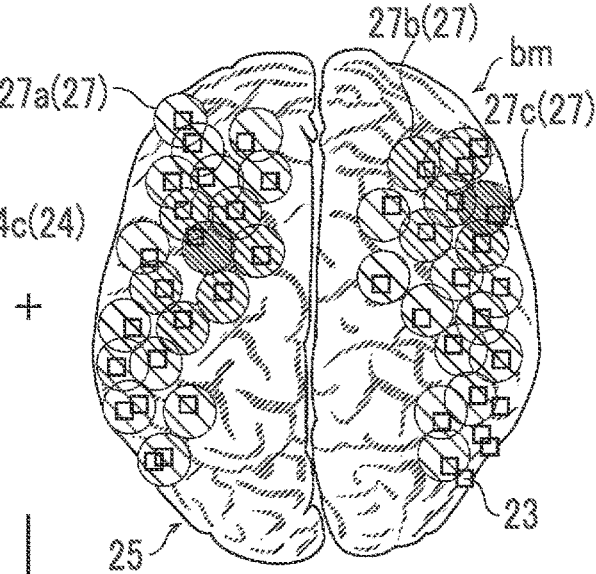
(C) THIRD BRAIN FUNCTION IMAGE
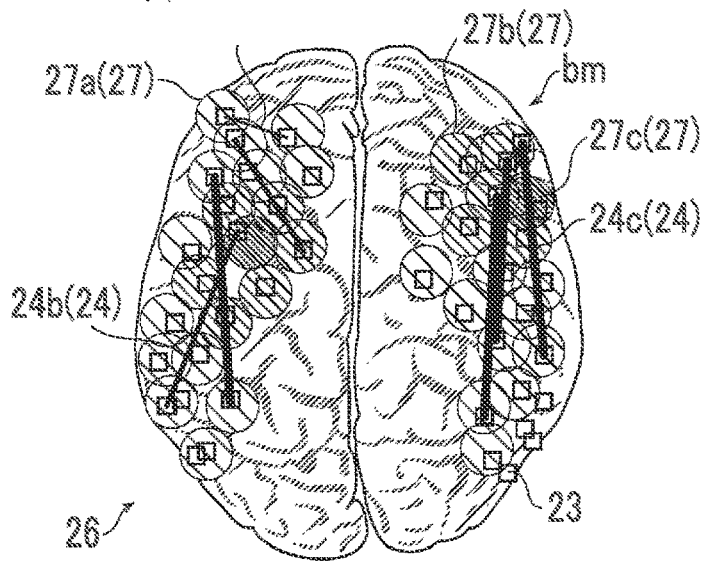
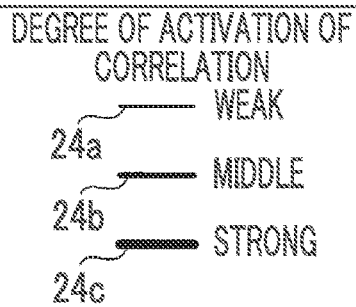
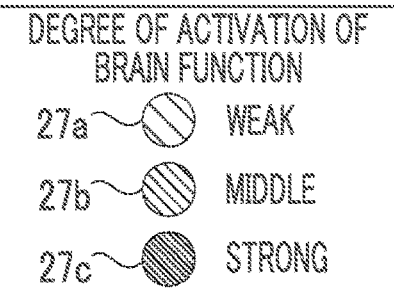

FIRST MODIFICATION EXAMPLE

SECOND MODIFICATION EXAMPLE

BRAIN FUNCTION MEASUREMENT DEVICE

CROSS REFERENCE TO RELATED APPLICATIONS

This application is a National Stage of International Application No. PCT/JP2019/050294 filed Dec. 23, 2019, claiming priority based on Japanese Patent Application No. 2019-021925 filed Feb. 8, 2019.

TECHNICAL FIELD

The present invention relates to a brain function measurement device, and particularly to a brain function measurement device that measures a brain function before and after task presentation.

BACKGROUND ART

In the related art, there is a brain function measurement device that measures a brain function before and after task presentation. Such a brain function measurement device is disclosed in, for example, Japanese Patent Application Laid-Open No. 2015-116213.

The brain function measurement device disclosed in Japanese Patent Application Laid-Open No. 2015-116213 is configured to measure a brain blood flow rate of a subject before and after task presentation, and calculate a change in a correlation (functional binding) of a brain region between a plurality of predetermined regions before and after the task presentation on the basis of the measured brain blood flow rate.

Specifically, the brain function measurement device disclosed in Japanese Patent Application Laid-Open No. 2015-116213 is configured to calculate a change in a correlation (functional connection) of a brain region between the plurality of predetermined regions before and after the task presentation by subtracting a value of the functional binding of the brain region between the plurality of predetermined regions at rest before the task presentation from a value of the functional binding of the brain region between the plurality of predetermined regions at rest after the task presentation. In Japanese Patent Application Laid-Open No. 2015-116213, the correlation (functional connection) of the brain region between the plurality of predetermined regions before and after the task presentation is shown by using a matrix diagram in which names of respective regions of interest are expressed on a vertical axis and a horizontal axis.

CITATION LIST

Patent Literature

[PTL 1] Japanese Patent Application Laid-Open No. 2015-116213

SUMMARY OF INVENTION

Technical Problem

However, the matrix diagram disclosed in Japanese Patent Application Laid-Open No. 2015-116213 shows the names of the respective regions of interest. Therefore, there is a problem in that it is difficult for non-experts to intuitively understand a part of the brain of which a correlation (functional connection) between regions is changing in the brain region before and after the task is presented.

The present invention has been made to solve the above problem, and one object of the present invention is to provide a brain function measurement device enabling to intuitively understand a change in a correlation (functional connection) of a brain region between a plurality of predetermined regions before and after task presentation and a position of the brain region of which the correlation (functional connection) has changed.

Solution to Problem

In order to achieve the above object, according to a first aspect of the present invention, there is provided a brain function measurement device including a brain blood flow information acquisition unit that acquires brain blood flow information of a subject; a brain function information acquisition unit that acquires brain function correlation information indicating a relative change in a correlation between respective portions of a brain acquired on the basis of the brain blood flow information measured in a plurality of portions of the brain before and after a task is presented; and a brain function image generation unit that generates a first brain function image in which a relative position of each measurement position for the brain blood flow information and the measurement position at which the correlation acquired on the basis of the brain function correlation information has changed are visually recognizable.

The brain function measurement device according to the first aspect of the present invention includes the brain function image generation unit that generates the first brain function image in which a relative position of each measurement position for the brain blood flow information and the measurement position at which the correlation acquired on the basis of the brain function correlation information has changed are visually recognizable. Consequently, it is possible to understand the measurement position of the brain blood flow information and the measurement position at which the correlation has changed by observing the first brain function image. As a result, the measurement position of the brain blood flow information and the measurement position at which a correlation has changed can be understood from the first brain function image, and thus It is possible to intuitively understand a change in a correlation (functional connection) of a brain region between a plurality of predetermined regions before and after task presentation and a position of the brain region of which the correlation (functional connection) has changed.

Preferably, the brain function measurement device according to the first aspect further includes a brain shape information acquisition unit that acquires a map indicating a shape of the brain of the subject, and the brain function image generation unit is configured to generate the first brain function image in which the measurement position is displayed on the map and a position of the brain function correlation information on the map is visually recognizable. With this configuration, it is possible to understand a position of the brain function correlation information on the map indicating a shape of the brain by observing the first brain function image. As a result, the position of the brain function correlation information can be understood on the map bm indicating the shape of the brain, and thus it is possible to intuitively understand a change in a correlation (functional connection) of a brain region between a plurality of predetermined regions before and after the task is presented and a position of the brain region of which the correlation (functional connection) has changed.

In the brain function measurement device according to the first aspect, preferably, the brain function image generation unit is configured to generate the first brain function image in which display aspects of the measurement positions are different from each other on the basis of an amount of change in the correlation. With this configuration, it is possible to understand a difference in an amount of change in a correlation by checking the first brain function image. As a result, since it is possible to easily understand the measurement position at which the correlation of the brain function is activated before and after task presentation by checking the first brain function image, it is possible to easily understand a region of the brain in which the correlation of the brain function is activated before and after the task presentation.

In the configuration of generating the first brain function image in which the position of the brain function correlation information on the map is visually recognizable, preferably, the brain function image generation unit is configured to generate the first brain function image in which the measurement position and the measurement position between two points at which the correlation acquired on the basis of the brain function correlation information has changed are visually recognizable. With this configuration, it is possible to easily understand a combination of the measurement positions at which the correlation has changed by checking the first brain function image. As a result, it is possible to easily understand a combination of measurement positions at which the correlation has changed before and after the task is presented.

In this case, preferably, the brain function image generation unit is configured to generate the first brain function image in which the measurement positions at which the correlation is activated before and after the task is presented are displayed by being connected to each other via a connection line on the map. With this configuration, it is possible to easily understand the measurement positions at which the correlation of the brain functions is activated before and after the task is presented by observing the connection line between the measurement positions in the first brain function image. As a result, it is possible to easily understand the measurement positions at which the correlation between the brain functions is activated before and after the task is presented from the connection line between the measurement positions in the first brain function image, and thus to easily understand a region of the brain in which the correlation of the brain function is activated.

In the configuration of generating the first brain function image in which the measurement positions at which the correlation is activated before and after the task is presented are displayed by being connected to each other via the connection line, preferably, the brain function image generation unit is configured to generate the first brain function image in which a degree of activation of the correlation in the first brain function image is identifiable before and after the task is presented. With this configuration, it is possible to recognize the degree of activation of the correlation of the brain function by observing the first brain function image. As a result, the degree of activation of the correlation of the brain functions can be identified in the first brain function image. Therefore, it is possible to easily and intuitively understand not only a change in the correlation of the brain function but also the degree of activation of the correlation of the brain function by observing the first brain function image.

In this case, preferably, the brain function image generation unit is configured to generate the first brain function image in which the degree of activation of the correlation is identifiable by changing at least one of a color or a width of the connection line. With this configuration, in the first brain function image, the degree of activation of the correlation of the brain function can be identified according to a difference in a color of the connection line or a difference in a width of the connection line and thus it is possible to more easily and intuitively understand the degree of activation of the correlation of the brain function.

In the brain function measurement device according to the first aspect, preferably, the brain function information acquisition unit is configured to acquire the brain function correlation information by acquiring a difference value in the correlation before and after the task is presented. With this configuration, it is possible to acquire the brain function correlation information by acquiring the difference value of the correlation before and after the task is presented, and thus to easily acquire the brain function correlation information.

In the brain function measurement device according to the first aspect, preferably, the brain function image generation unit is configured to further generate a second brain function image in which a region including the measurement position where the brain function at the time of presenting the task acquired on the basis of the brain blood flow information at the time of presenting the task is activated is visually recognizable, and the brain function image generation unit is configured to output the first brain function image and the second brain function image to be displayed in a contrastable manner. With this configuration, the first brain function image and the second brain function image can be contrasted and observed. As a result, the first brain function image and the second brain function image can be compared with each other, and thus it is possible to intuitively understand a change in the correlation of the brain function before and after the task is presented and the region in which the brain function at the time of presenting the task is activated.

In this case, preferably, the brain function image generation unit is configured to output the first brain function image and the second brain function image to be superimposed and displayed. With this configuration, the third brain function image in which the first brain function image and the second brain function image are superimposed can be observed. As a result, the change in the correlation of the brain function and the region including the measurement position at which the brain function is activated can be observed with one image, and thus positions of the region in which the correlation of the brain function has changed and the region in which the brain function is activated can be easily contrasted.

In the configuration of outputting the first brain function image and the second brain function image to be displayed in a contrastable manner, preferably, the brain function image generation unit is configured to output the first brain function image and the second brain function image to be arranged and displayed. With this configuration, each image can be observed in a state in which the first brain function image and the second brain function image are arranged. As a result, it is possible to observe the respective images side by side, and thus it is easy to contrast the overall distribution of a region in which a correlation of the brain function has changed with the overall distribution of the region in which the brain function is activated.

In the configuration of outputting the first brain function image and the second brain function image to be displayed in a contrastable manner, preferably, the brain function image generation unit is configured to generate the first brain function image and the second brain function image by making a display aspect of a positional relationship of the brain function correlation information at the measurement position in the first brain function image different from a display aspect of a region including the measurement position at which the brain function at the time of presenting the task in the second brain function image is activated. With this configuration, since a display aspect of the positional relationship of the brain function correlation information at the measurement position in the first brain function image is different from a display aspect of the region including the measurement position at which the brain function at the time of presenting the task in the second brain function image is activated, even in a case where the first brain function image and the second brain function image are contrasted, it is possible to differentiate a positional relationship of the brain function correlation information at the measurement position from the region including the measurement position at which the brain function at the time of presenting the task is activated. As a result, for example, even in a case where the first brain function image and the second brain function image are superimposed and displayed, a positional relationship of the brain function correlation information and the region including the measurement position at which the brain function is activated can be observed in a state of being distinguished from each other, and thus it is possible to improve the visibility of the images when a doctor or the like evaluates the brain function of the subject.

According to a second aspect of the present invention, there is provided a brain function measurement device including a brain blood flow information acquisition unit that acquires brain blood flow information of a subject; and a brain function image generation unit that generates a first brain function image indicating a relative change in a correlation between respective portions of a brain based on the brain blood flow information before and after a task is presented and a second brain function image indicating a region in which a brain function based on the brain blood flow information at the time of presenting the task is activated, and outputs the first brain function image and the second brain function image to be displayed in a contrastable manner.

As described above, the brain function measurement device according to the second aspect of the present invention includes the brain function image generation unit that generates the first brain function image and the second brain function image, and outputs the first brain function image and the second brain function image to be displayed in a contrastable manner. Consequently, the first brain function image and the second brain function image can be contrasted and observed. As a result, it is possible to compare a change in the correlation of the brain function before and after presentation of the task with the region including the measurement position at which the brain function is activated at the time of presenting the task, and thus to provide the brain function measurement device enabling the change in the correlation of the brain function before and after presentation of the task and activation of the brain function at the time of presenting the task to be intuitively understood. Since a change in the correlation of brain function before and after the task is presented and activation of the brain function at the time of presenting the task can be contrasted and observed, findings such as the change in the correlation of the brain function due to the presentation of the task can be obtained.

Advantageous Effects of Invention

According to the present invention, as described above, it is possible to provide a brain function measurement device enabling to intuitively understand a change in a correlation (functional connection) of a brain region between a plurality of predetermined regions before and after task presentation and a position of the brain region of which the correlation (functional connection) has changed.

BRIEF DESCRIPTION OF DRAWINGS

FIG. 1 is a schematic diagram illustrating an overall configuration of a brain function measurement device according to a first embodiment.

FIG. 2 is a schematic diagram illustrating a configuration of a blood flow information acquisition unit.

FIG. 9 at (A) and (B) are respective schematic diagrams of the first brain function image and the second brain function image generated by the brain function measurement device according to the second embodiment, and FIG. 9 at (C) is a schematic diagram of a third brain function image output by the brain function measurement device to a brain function image display unit.

DESCRIPTION OF EMBODIMENTS

Figure 3:
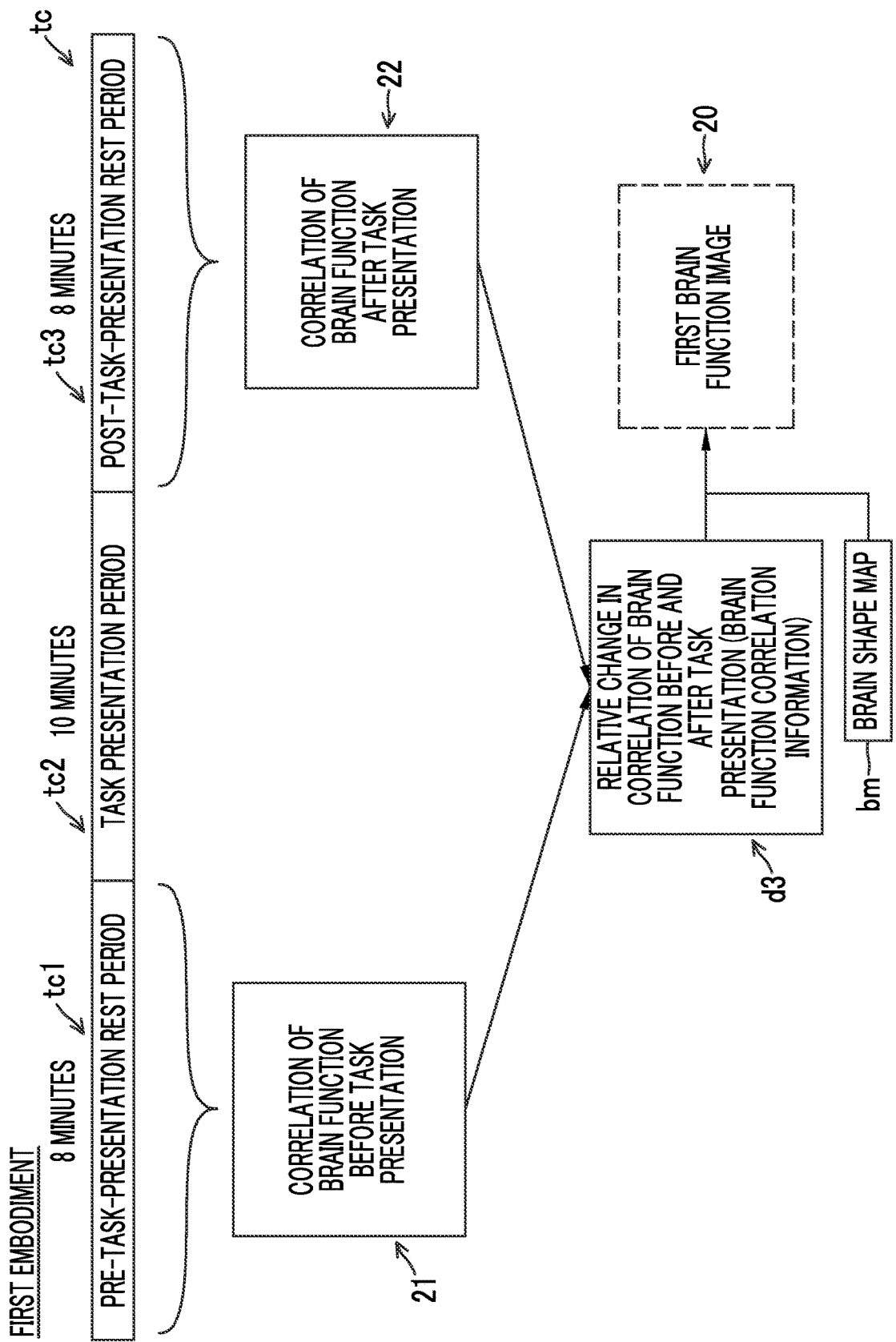
FIG. 3 is a schematic diagram for describing a process of acquiring a correlation between brain functions and a process of generating a first brain function image in the brain function measurement device.

Hereinafter, embodiments embodying the present invention will be described with reference to the drawings.

First Embodiment

A configuration of a brain function measurement device 100 according to a first embodiment of the present invention will be described with reference to FIGS. 1 and 2.

(Configuration of Brain Function Measurement Device)

First, a configuration of the brain function measurement device 100 according to the first embodiment will be described with reference to FIG. 1.

As illustrated in FIG. 1, the brain function measurement device 100 includes a brain blood flow information acquisition unit 1, a brain shape information acquisition unit 2, a control unit 3, a brain function image generation unit 7, and a storage unit 8.

The brain function measurement device 100 is a device (optical measurement device) that optically measures the brain activity of a subject P by using, for example, near-infrared spectroscopy (NIRS), and generates time-series measurement result data.

In the first embodiment, the brain function measurement device 100 is configured to measure the brain activity when the subject P is executing a task displayed on a display unit 4 and the brain activities before and after executing the task. The display unit 4 includes, for example, a liquid crystal monitor.

The brain blood flow information acquisition unit 1 is configured to acquire brain blood flow information d1 of the subject P under the control of the control unit 3. A detailed configuration of the brain blood flow information acquisition unit 1 will be described later.

The brain shape information acquisition unit 2 is configured to acquire a map bm indicating a shape of the brain of the subject P from a brain shape information acquisition device 6. The brain shape information acquisition unit 2 is configured as a so-called input/output interface. The map bm indicating the shape of the brain acquired by the brain shape information acquisition unit 2 may be a plane image indicating the shape of the brain or a three-dimensional image indicating the shape of the brain.

The brain shape information acquisition device 6 is configured to acquire a map bm indicating the shape of the brain of the subject P under the control of the control unit 3. The brain shape information acquisition device 6 includes, for example, a magnetic resonance imaging device (MRI device). The brain shape information acquisition device 6 includes a control unit, a magnet that applies a high-frequency magnetic field to the subject P, a coil that acquires radio waves generated from hydrogen atoms in the body of the subject P by being applied with the high-frequency magnetic field, an image processing unit that generates a tomographic image of the subject P on the basis of the acquired radio waves, and a display unit that displays the tomographic image generated by the image processing unit.

The control unit 3 is configured to acquire the brain blood flow information d1 of the subject P via the brain blood flow information acquisition unit 1. The control unit 3 is configured to acquire the brain shape map bm of the subject P acquired by the brain shape information acquisition device 6 via the brain shape information acquisition unit 2. The control unit 3 is configured to acquire measurement position information d2 when the brain blood flow information d1 of the subject P is acquired by the brain blood flow information acquisition unit 1. The control unit 3 includes a brain function information acquisition unit 30 that acquires brain function correlation information d3 indicating a relative change in a correlation of the brain before and after task presentation. The control unit 3 is configured to store the acquired brain blood flow information d1, the brain shape map bm of the subject P, the measurement position information d2, and the brain function correlation information d3 acquired by the brain function information acquisition unit 30 into the storage unit 8. The control unit 3 is configured to control the brain function image generation unit 7 to generate a first brain function image 20. The control unit 3 is a computer configured with a central processing unit (CPU), a memory, and the like, and is configured to function as the control unit 3 of the brain function measurement device 100 by executing various programs stored in the storage unit 8.

The brain function information acquisition unit 30 is configured to acquire brain function correlation information d3 indicating a relative change in a correlation of the brain before and after task presentation. The control unit 3 is configured to function as the brain function information acquisition unit 30 by executing the program stored in the storage unit 8. A detailed configuration in which the brain function information acquisition unit 30 acquires the brain function correlation information d3 will be described later.

The brain function image generation unit 7 is configured to generate the first brain function image 20 under the control of the control unit 3. The brain function image generation unit 7 is configured to output the generated first brain function image 20 to the brain function image display unit 40 to be displayable. The detailed configuration in which the brain function image generation unit 7 generates the first brain function image 20 will be described later.

The brain function image display unit 40 is configured to display the first brain function image 20 output from the brain function image generation unit 7. The brain function image display unit 40 includes, for example, a liquid crystal monitor.

The storage unit 8 is configured to store a control program executed by the control unit 3 and setting information, and also store the brain blood flow information d1, the map bm indicating the shape of the brain, the measurement position information d2, the brain function correlation information d3, and the like. The storage unit 8 includes, for example, a hard disk drive (HDD), a non-volatile memory, and the like.

(Structure of Brain Blood Flow Information Acquisition Unit)

Next, a configuration of the brain blood flow information acquisition unit 1 will be described with reference to FIG. 2.

The brain blood flow information acquisition unit 1 is configured to acquire the brain blood flow information d1 of the subject P by using measurement probes (a light transmission probe 10a and a light reception probe 10b) connected to each other via an optical fiber.

As illustrated in FIG. 2, the brain blood flow information acquisition unit 1 includes light transmission probes 10a, light reception probes 10b, a light output unit 11, a light detection unit 12, a measurement control unit 13, and a main body control unit 14, a storage unit 15 and an input/output unit 16.

The light transmission probe 10a and the light reception probe 10b of the brain blood flow information acquisition unit 1 are respectively attached to probe fixing holders 5 attached to the head of the subject P to be disposed at predetermined positions on the head surface of the subject P. The measurement position information d2 indicates locations where the light transmission probe 10a and the light reception probe 10b are disposed. Specifically, the measurement position information d2 is coordinate values of the locations where the light transmission probe 10a and the light reception probe 10b are disposed.

The light output unit 11 is configured to be capable of outputting a plurality of measurement light beams to the light transmission probe 10a in a wavelength region of near infrared light. The light output unit 11 includes, for example, a semiconductor laser. The light detection unit 12 is configured to acquire and detect measurement light incident to the light reception probe 10b via the optical fiber. The light detection unit 12 includes, for example, a photomultiplier tube.

The measurement control unit 13 measures the brain function with the measurement probes (the light transmission probes 10a and the light reception probes 10b) disposed on the head of the subject P. The main body control unit 14 is a computer configured with a CPU, a memory, and the like, and functions as the main body control unit 14 of the brain blood flow information acquisition unit 1 by executing various programs stored in the storage unit 15. The storage unit 15 is configured with, for example, an HDD, and can store the control program and setting information executed by the main body control unit 14, and can store the brain blood flow information d1 obtained as a result of the measurement. The input/output unit 16 is an interface for connecting to an external device such as the control unit 3.

The light output unit 11 applies the measurement light in the wavelength region of the near infrared light from the light transmission probes 10a disposed on the head surface of the subject P. The light detection unit acquires the intensity (amount of received light) of the measurement light by causing the measurement light reflected inside the head to be incident to the light reception probes 10b disposed on the head surface and detecting the measurement light. A plurality of light transmission probes 10a and light reception probes 10b are provided, and are attached to the holders 5 for fixing the respective probes at predetermined positions on the head surface. The measurement control unit 13 measures amounts of change in oxygenated hemoglobin, deoxygenated hemoglobin, and total hemoglobin on the basis of the intensity (amount of received light) of the measurement light at a plurality of wavelengths (for example, three wavelengths of 780 nm, 805 nm, and 830 nm) and the absorption characteristics of hemoglobin. The measurement control unit 13 is configured to acquire the brain blood flow information d1 of the subject P by acquiring an amount of change in hemoglobin. The brain blood flow information acquisition unit 1 outputs the acquired brain blood flow information d1 to the control unit 3 of the brain function measurement device 100 via the input/output unit 16.

(Processes of Acquiring Brain Blood Flow Information and Generating First Brain Function Image)

Next, with reference to FIGS. 3 to 5, a configuration in which the brain function information acquisition unit 30 acquires the brain function correlation information d3 and a configuration in which the brain function image generation unit 7 generates the first brain function image 20 will be described.

FIG. 3 is a schematic diagram illustrating a flow of a process in which the brain function information acquisition unit 30 acquires the brain function correlation information d3 on the basis of the brain blood flow information d1 measured by the brain blood flow information acquisition unit 1 and a process in which the brain function image generation unit 7 generates the first brain function image 20. In the example illustrated in FIG. 3, the process performed by the brain function information acquisition unit 30 is indicated by a solid line, and the process performed by the brain function image generation unit 7 is indicated by a broken line.

In the first embodiment, measurement of the brain blood flow information d1 of the subject P is performed according to a method called a block design in which the measurement is repeatedly performed by using a set including a period in which a task is presented to the subject P and a period in which the task is not presented before and after the task is presented. A timing chart tc illustrated in FIG. 3 is a schematic diagram of the block design, and includes a pre-task-presentation rest period tc1 before presenting the task to the subject P, a task presentation period tc2, and a post-task-presentation rest period tc3. In the first embodiment, the brain function measurement device 100 is configured to acquire the brain blood flow information d1 of the subject P in the pre-task-presentation rest period tc1 for a predetermined time. In the first embodiment, the brain function measurement device 100 is configured to acquire the brain blood flow information d1 of the subject P in the task presentation period tc2 of a predetermined time. In the first embodiment, the brain function measurement device 100 is configured to acquire the brain blood flow information d1 of the subject P in the post-task-presentation rest period tc3 of a predetermined time. The example illustrated in FIG. 3 is an example in which the brain blood flow information d1 of the subject P is acquired for 8 minutes as each of the pre-task-presentation rest period tc1 and the post-task-presentation rest period tc3. In the example illustrated in FIG. 3, the task is assigned to the subject P for 10 minutes as the task presentation period tc2.

The brain function information acquisition unit 30 is configured to acquire a correlation 21 (hereinafter, referred to as a first correlation 21) between respective portions of the brain of the subject P before the task presentation on the basis of the brain blood flow information d1 of the subject P in the pre-task-presentation rest period tc1. The brain function information acquisition unit 30 is configured to acquire a correlation 22 (hereinafter, referred to as a second correlation 22) between the respective portions of the brain of the subject P after the task is presented, on the basis of the brain blood flow information d1 of the subject P in the post-task-presentation rest period tc3. Specific examples of the first correlation 21 and the second correlation 22 acquired by the brain function information acquisition unit 30 will be described later. Each portion of the brain is a region of the brain where the brain blood flow information d1 is measured. The correlation between the respective portions of the brain is a correlation coefficient of a cross-correlation between the respective regions.

The brain function information acquisition unit 30 is configured to acquire brain function correlation information d3 indicating a relative change in the correlation between respective portions of the brain acquired on the basis of the brain blood flow information d1 measured in a plurality of portions of the brain before and after task presentation. Specifically, the brain function information acquisition unit 30 is configured to acquire the brain function correlation information d3 by acquiring a difference value of a correlation before and after task presentation. In the first embodiment, the brain function information acquisition unit 30 is configured to acquire the brain function correlation information d3 by subtracting the first correlation 21 from the second correlation 22.

In the first embodiment, as illustrated in FIG. 3, the brain function image generation unit 7 is configured to generate the first brain function image 20 on the basis of the brain function correlation information d3 and the map bm indicating the shape of the brain.

Next, with reference to FIG. 4, specific examples of the brain function correlation information d3 acquired by the brain function measurement device 100 according to the first embodiment and the first brain function image 20 generated by the brain function measurement device 100 will be described.

Figure 4:
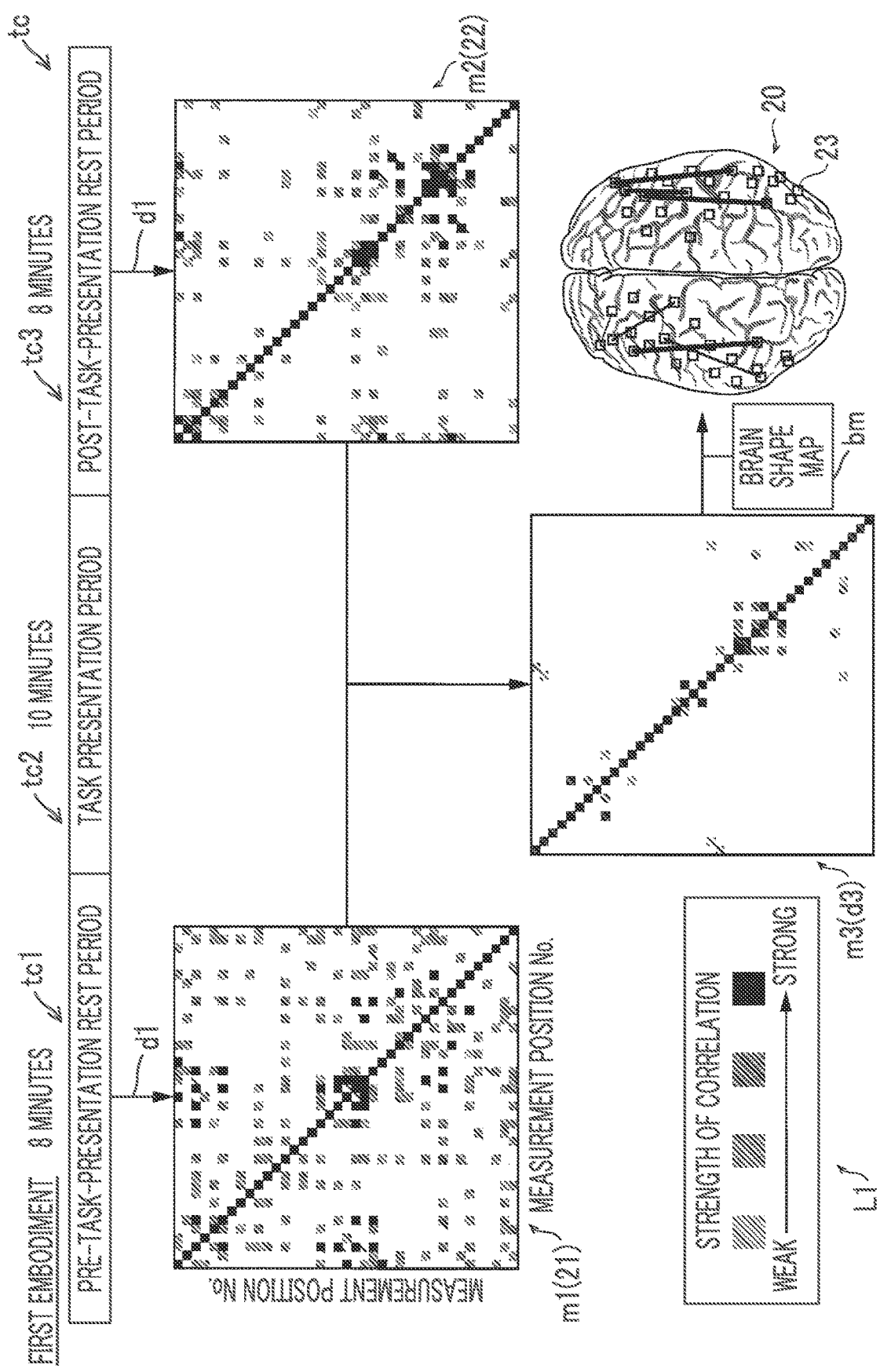
FIG. 4 is a schematic diagram for describing a correlation between brain functions, brain function correlation information, and the first brain function image before and after task presentation.

As illustrated in FIG. 4, in the first embodiment, the brain function information acquisition unit 30 acquires, as the first correlation 21, a first matrix diagram m1 in which respective measurement positions 23 when the brain blood flow information d1 is acquired are expressed on a vertical axis and a horizontal axis. Specifically, the brain function information acquisition unit 30 is configured to acquire a correlation coefficient of the brain blood flow information d1 at each measurement position 23 on the basis of the brain blood flow information d1 at each measurement position 23. The brain function information acquisition unit 30 acquires the first matrix diagram m1 by arranging the correlation coefficients of the brain blood flow information d1 at the respective acquired measurement positions 23 in the order of numbers of the measurement positions 23.

The brain function information acquisition unit 30 acquires, as the second correlation 22, a second matrix diagram m2 in which respective measurement positions 23 when the brain blood flow information d1 is acquired are expressed on a vertical axis and a horizontal axis. The brain function information acquisition unit 30 acquires the brain function correlation information d3 (third matrix diagram m3) by acquiring a difference value between the first matrix diagram m1 and the second matrix diagram m2. The brain function information acquisition unit 30 acquires the second matrix diagram m2 and the third matrix diagram m3 in the same manner as the first matrix diagram m1. The brain function correlation information d3 (third matrix diagram m3) is information indicating the measurement position 23 at which a correlation of a brain function has changed before and after the task is presented by executing the task. In the first embodiment, the measurement position 23 of the brain blood flow information d1 is indicated by a quadrangular shape on the map bm.

Each matrix diagram represents a strength of a correlation of a brain function at each measurement position 23 on the basis of the brain blood flow information d1. In the first embodiment, the brain function information acquisition unit 30 is configured to represent a difference in activation of a correlation of a brain function with a difference in color. Specifically, the brain function information acquisition unit 30 is configured to display a location where the correlation of the brain function is not activated in green, and display the location by changing a color to yellow, orange, and red as the activation of the correlation of the brain function becomes stronger. The brain function information acquisition unit 30 is configured to display the location in blue in a case where the activation of the correlation of the brain function becomes weak (a change in the correlation of the brain function becomes negative). The activation of the correlation of the brain function indicates that a change in the correlation coefficient of the brain function is equal to or more than a predetermined threshold value before and after task presentation.

In the matrix diagram illustrated in FIG. 4, for convenience, the degree of strength of activation of the correlation of the brain function is represented by a difference in the density of hatching as shown in a legend L1 indicating the strength of the correlation. The example illustrated in FIG. 4 is an example in which the correlation of the brain function is activated as the hatching becomes darker. In each matrix diagram illustrated in FIG. 4, hatching is shown to be dark on a diagonal line extending from the upper left to the lower right. This diagonal line indicates a correlation of each measurement position 23 itself, and is a location where the correlation becomes strong before and after task presentation and at the time of presenting a task and the hatching is always displayed dark. Therefore, this diagonal line is data that is not used when a change in the correlation of the brain function due to task presentation is measured. In the example illustrated in FIG. 4, a location where the hatching in each matrix diagram is not given indicates that a change in the correlation of the brain function is small before and after task presentation.

In the first embodiment, the brain function image generation unit 7 is configured to generate the first brain function image 20 in which a relative position of each measurement position 23 for the brain blood flow information d1 and the measurement position 23 at which a correlation acquired on the basis of the brain function correlation information has changed can be visually recognized. Specifically, the brain function image generation unit 7 is configured to generate the first brain function image 20 on the basis of the brain function correlation information d3, the map bm indicating the shape of the brain, and the measurement position information d2.

(Brain Function Image)

Next, the first brain function image 20 generated by the brain function image generation unit 7 according to the first embodiment will be described with reference to FIG. 5.

Figure 5:
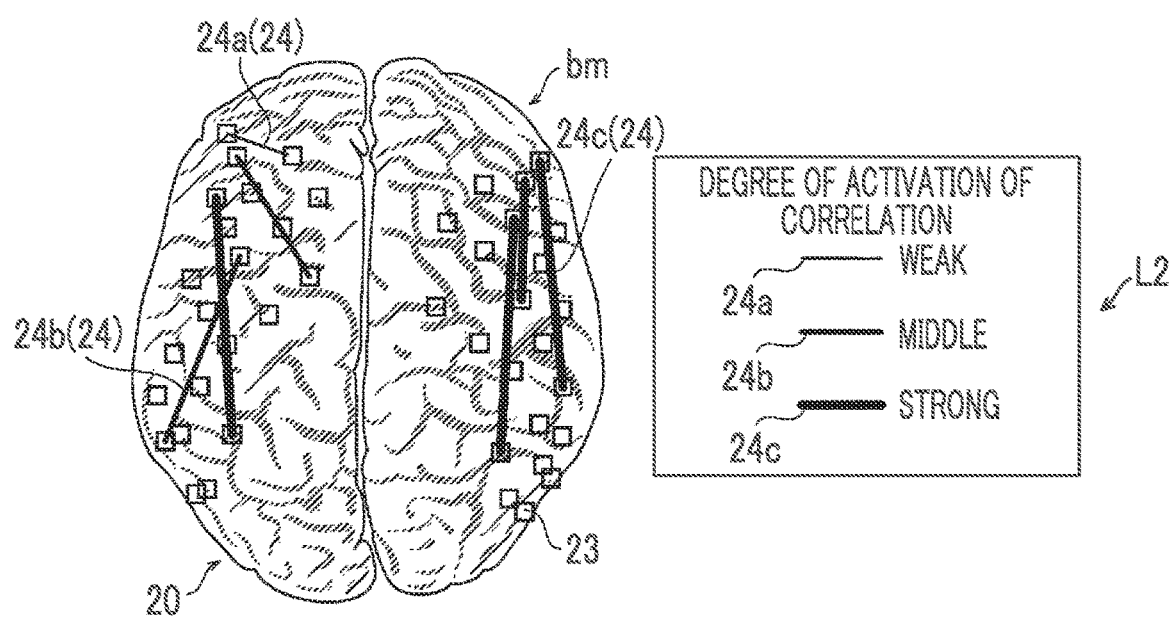
FIG. 5 is a schematic diagram of the first brain function image output by the brain function measurement device to a brain function image display unit.

FIG. 5 is a schematic diagram of the first brain function image 20 generated by the brain function image generation unit 7 according to the first embodiment. As illustrated in FIG. 5, the brain function image generation unit 7 is configured to generate the first brain function image 20 in which the measurement positions 23 are displayed on the map bm and a position of the brain function correlation information d3 on the map bm can be visually recognized. Specifically, the brain function image generation unit 7 is configured to generate the first brain function image 20 in which the measurement positions 23 are displayed in different aspects on the basis of an amount of change in the correlation. The brain function image generation unit 7 is configured to generate the first brain function image 20 in which the measurement position 23 and the measurement position 23 between two points at which a correlation acquired on the basis of the brain function correlation information has changed can be visually recognized. Specifically, the brain function image generation unit 7 is configured to generate the first brain function image 20 in which the measurement positions 23 at which a correlation is activated before and after task presentation are displayed on the map bm to be connected to each other via a connection line 24. In the example illustrated in FIG. 5, the connection line 24 is illustrated by a solid line, but the connection line 24 is not limited to the solid line. For example, the measurement positions 23 may be displayed by being connected to each other via the connection line 24 such as a broken line or a chain line. The connection line 24 may be any kind of line as long as it is possible to connect and display the measurement positions 23 at which a correlation of the brain function is activated.

The brain function image generation unit 7 is configured to generate the first brain function image 20 in which the degree of activation of the correlation in the first brain function image 20 before and after task presentation can be identified. Specifically, the brain function image generation unit 7 is configured to generate the first brain function image 20 in which the degree of activation of the correlation can be identified by changing a width of the connection line 24. In the example illustrated in FIG. 5, the degree of activation of the correlation of the brain function is displayed to be identifiable in three stages by changing a thickness of the connection line 24 according to the degree of activation of the correlation of the brain function. That is, as shown in a legend L2 indicating the degree of activation of the correlation, the activation of the correlation of the brain function becomes stronger in the order of a connection line 24*a*, a connection line 24*b*, and a connection line 24*c*.

In the first embodiment, the brain function image generation unit 7 is configured to connect the measurement positions 23 at which the correlation is activated via the connection line 24 in a case where the activation of the correlation of the brain function exceeds a predetermined threshold value. Consequently, it is possible to suppress display of an excessive number of connection lines 24 on the first brain function image 20, and thus to improve the readability of the first brain function image 20.

(Process in which Brain Function Measurement Device Generates Brain Function Image)

Figure 6:
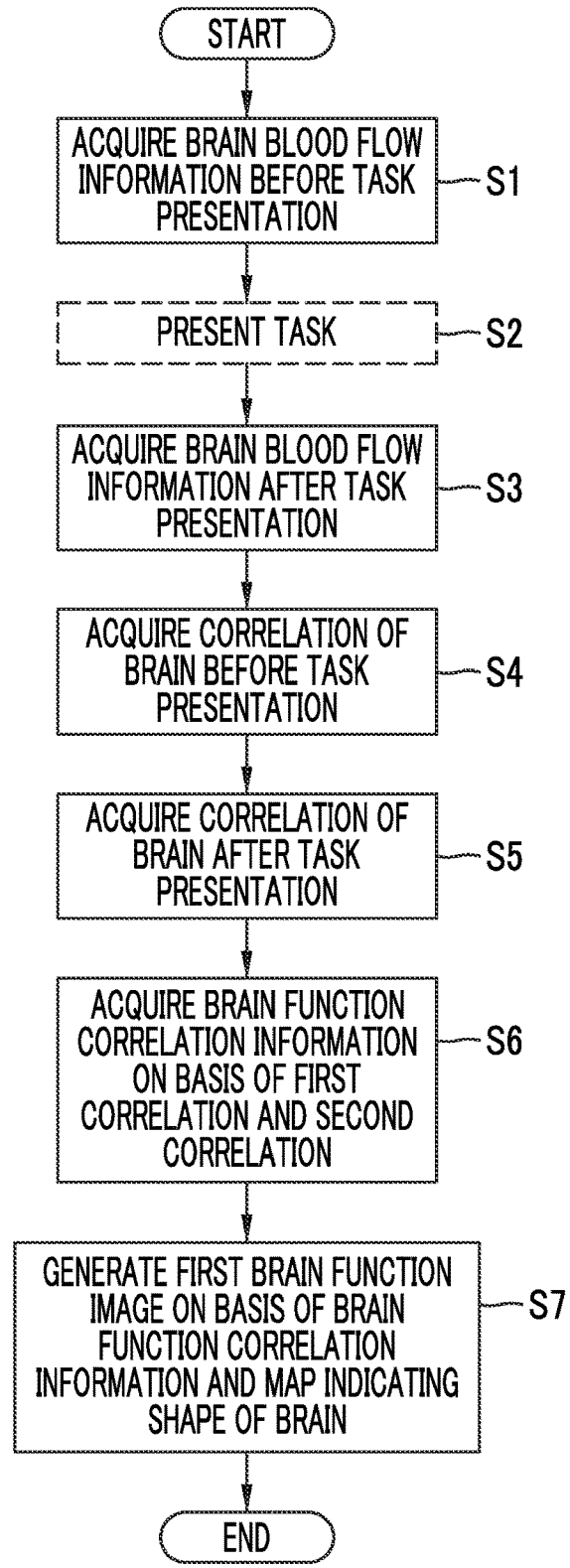
FIG. 6 is a flowchart for describing a process in which the brain function measurement device generates the first brain function image.

Next, with reference to FIG. 6, a series of processes in which the brain function measurement device 100 according to the first embodiment generates the first brain function image 20 will be described. In FIG. 6, a process performed by a person (for example, a doctor) other than the brain function measurement device 100 is indicated by a broken line.

In step S1, the control unit 3 acquires the brain blood flow information d1 before a task is presented. Thereafter, in step S2, a doctor or the like presents the task to the subject P by displaying the task on the display unit 4. Thereafter, the process proceeds to step S3. The brain blood flow information acquisition unit 1 also acquires the brain blood flow information d1 of the subject P in step S2.

In step S3, the control unit 3 acquires the brain blood flow information d1 after the task is presented. Thereafter, in step S4, the brain function information acquisition unit 30 acquires the first correlation 21. Thereafter, in step S5, the brain function information acquisition unit 30 acquires the second correlation 22. Thereafter, the process proceeds to step S6. The process in step S4 may be executed before step S3, or may be performed after step S5 is executed. That is, the process in step S4 may be performed at any timing before the process proceeds to step S6.

In step S6, the brain function information acquisition unit 30 acquires the brain function correlation information d3 on the basis of the first correlation 21 and the second correlation 22. Thereafter, in step S7, the brain function image generation unit 7 generates the first brain function image 20 on the basis of the brain function correlation information d3 and the map bm indicating the shape of the brain, and finishes the process.

In the first embodiment, the brain function image generation unit 7 is configured to output the generated first brain function image 20 to the brain function image display unit 40, and thus a doctor or the like can intuitively understand a change in the correlation of the brain function of the subject P due to the task presentation by observing the first brain function image 20 displayed on the brain function image display unit 40.

Effects of First Embodiment

In the first embodiment, the following effects can be achieved.

In the first embodiment, as described above, the brain function measurement device 100 includes the brain blood flow information acquisition unit 1 that acquires the brain blood flow information d1 of the subject P, the brain function information acquisition unit 30 that acquires the brain function correlation information d3 indicating a relative change in a correlation between respective portions of the brain acquired on the basis of the brain blood flow information d1 measured at a plurality of portions of the brain before and after task presentation, and the brain function image generation unit that generates the first brain function image 20 in which a relative position of each measurement position 23 for the brain blood flow information d1 and the measurement position 23 at which a correlation acquired on the basis of the brain function correlation information has changed can be visually recognized. Consequently, it is possible to understand the measurement position 23 of the brain blood flow information d1 and the measurement position 23 at which a correlation has changed by observing the first brain function image 20. As a result, the measurement position 23 of the brain blood flow information d1 and the measurement position 23 at which a correlation has changed can be understood from the first brain function image 20, and thus it is possible to intuitively understand a change in a correlation (functional connection) of a brain region between a plurality of predetermined regions before and after task presentation and a position of the brain region of which the correlation (functional connection) has changed.

In the first embodiment, as described above, the brain shape information acquisition unit 2 that acquires the map bm indicating a shape of the brain of the subject P is further provided, and the brain function image generation unit 7 is configured to generate the first brain function image 20 in which the measurement positions 23 are displayed on the map bm and a position of the brain function correlation information d3 on the map bm can be visually recognized. Consequently, it is possible to understand the position of the brain function correlation information d3 on the map bm indicating a shape of the brain by observing the first brain function image 20. As a result, the position of the brain function correlation information d3 can be understood on the map bm indicating the shape of the brain, and thus it is possible to intuitively understand a change in a correlation (functional connection) of a brain region between a plurality of predetermined regions before and after task presentation and a position of the brain region of which the correlation (functional connection) has changed.

In the first embodiment, as described above, the brain function image generation unit 7 is configured to generate the first brain function image 20 in which the measurement positions 23 are displayed in different aspects on the basis of an amount of change in the correlation. Consequently, it is possible to understand a difference in an amount of change in a correlation by checking the first brain function image 20. As a result, since it is possible to easily understand the measurement position 23 at which the correlation of the brain function is activated before and after task presentation by checking the first brain function image 20, it is possible to easily understand a region of the brain in which the correlation of the brain function is activated before and after the task presentation.

In the first embodiment, as described above, the brain function image generation unit 7 is configured to generate the first brain function image 20 in which the measurement position 23 and the measurement position 23 between two points at which a correlation acquired on the basis of the brain function correlation information has changed can be visually recognized. Consequently, it is possible to easily understand a combination of the measurement positions 23 at which the correlation has changed by checking the first brain function image 20. As a result, it is possible to easily understand a combination of the measurement positions 23 at which the correlation has changed before and after task presentation.

In the first embodiment, as described above, the brain function image generation unit 7 is configured to generate the first brain function image 20 in which the measurement positions 23 at which a correlation is activated before and after task presentation are displayed on the map bm to be connected to each other via the connection line 24. Consequently, it is possible to easily understand the measurement positions 23 at which the correlation of the brain functions is activated before and after task presentation by observing the connection line 24 between the measurement positions 23 in the first brain function image 20. As a result, it is possible to easily understand the measurement positions 23 at which the correlation between the brain functions is activated before and after task presentation from the connection line 24 between the measurement positions 23 in the first brain function image 20, and thus to easily understand a region of the brain in which the correlation of the brain function is activated.

In the first embodiment, as described above, the brain function image generation unit 7 is configured to generate the first brain function image 20 in which the degree of activation of the correlation in the first brain function image 20 before and after task presentation can be identified. Consequently, it is possible to recognize the degree of activation of the correlation of the brain function by observing the first brain function image 20. As a result, the degree of activation of the correlation of the brain functions can be identified in the first brain function image 20. Therefore, it is possible to easily and intuitively understand not only a change in the correlation of the brain function but also the degree of activation of the correlation of the brain function by observing the first brain function image 20.

In the first embodiment, as described above, the brain function image generation unit 7 is configured to generate the first brain function image 20 in which the degree of activation of the correlation can be identified by changing a width of the connection line 24.

Consequently, in the first brain function image 20, the degree of activation of the correlation of the brain function can be identified according to a difference in a width of the connection line 24, and thus it is possible to more easily and intuitively understand the degree of activation of the correlation of the brain function.

In the first embodiment, as described above, the brain function information acquisition unit 30 is configured to acquire the brain function correlation information d3 by acquiring a difference value of a correlation before and after task presentation. Consequently, it is possible to acquire the brain function correlation information d3 by acquiring the difference value of the correlation before and after the task presentation, and thus to easily acquire the brain function correlation information d3.

Second Embodiment

Next, a brain function measurement device 200 (refer to FIG. 1) according to a second embodiment of the present invention will be described with reference to FIGS. 1 and 7 to 9. In the first embodiment, the brain function correlation information d3 is acquired from the brain blood flow information d1 before and after the task presentation, and the first brain function image 20 is generated on the basis of the brain function correlation information d3 and the map bm indicating a shape of the brain. However, in the second embodiment, the brain function image generation unit 31 is configured to further generate a second brain function image 25 (refer to FIG. 7) in which a region 27 (refer to FIG. 8) including the measurement position 23 at which a brain function at the time of presenting a task acquired on the basis of the brain blood flow information d1 at the time of presenting the task is activated can be visually recognized and to output the first brain function image 20 and the second brain function image 25 to be displayed in a contrastable manner. The same constituent as that in the first embodiment is given the same reference numeral, and description thereof will not be repeated.

(Process on Second Brain Function Image)

Figure 7:
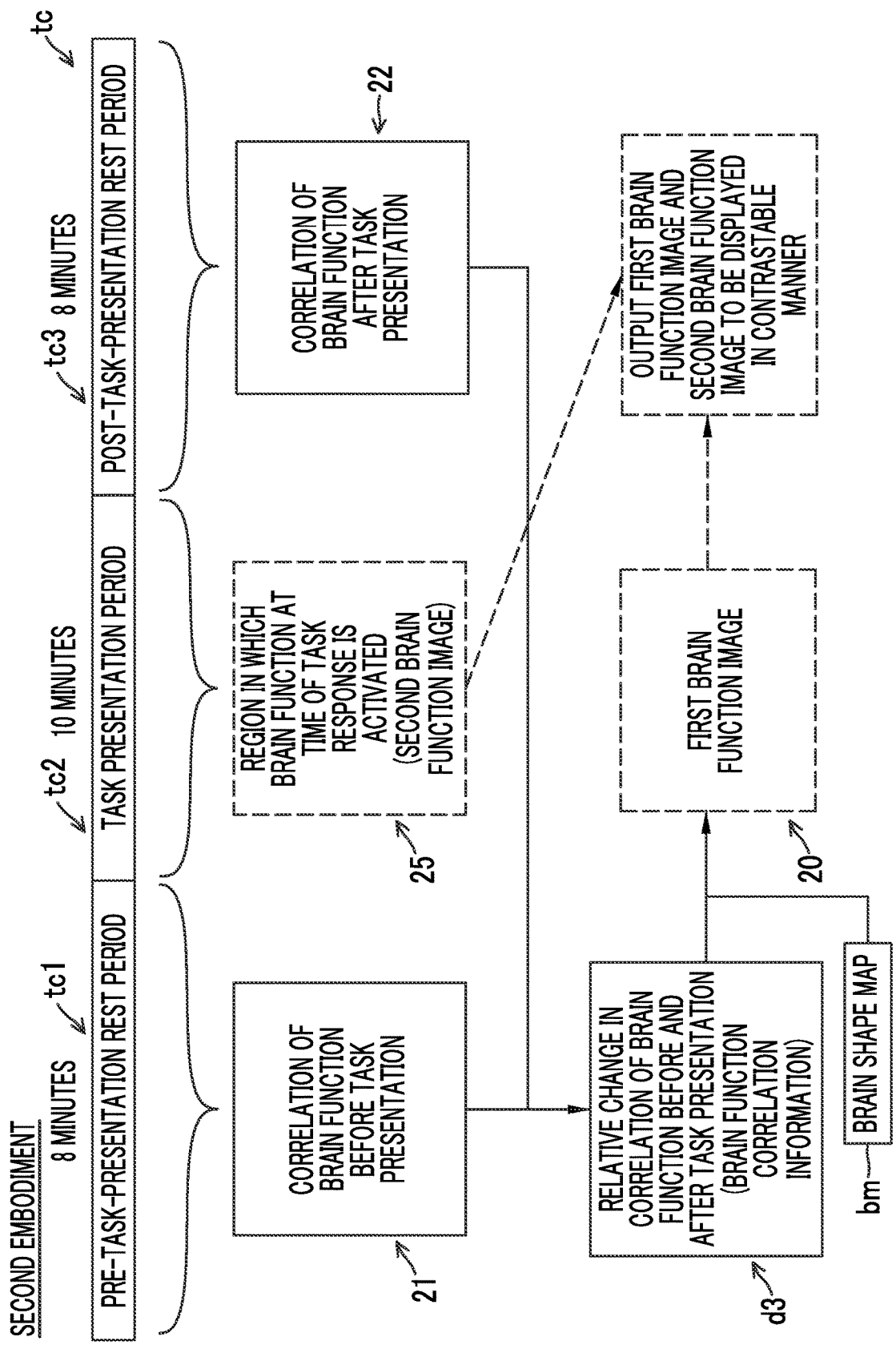
FIG. 7 is a schematic diagram for describing a process of acquiring a correlation between brain functions and a process of generating a first brain function image and a second brain function image in a brain function measurement device according to a second embodiment.

First, with reference to FIG. 7, a process in which the brain function image generation unit 31 generates the second brain function image 25 will be described. A timing chart tc illustrated in FIG. 7 is the same as the timing chart tc illustrated in FIG. 3, and thus detailed description thereof will be omitted. A process in which the brain function information acquisition unit 30 acquires the first correlation 21, the second correlation 22, and the brain function correlation information d3, and a process in which the brain function image generation unit 31 generates the first brain function image 20 are the same as those in the above first embodiment, and thus detailed description thereof will be omitted. Also in FIG. 7, as illustrated in FIG. 3 in the above first embodiment, the process performed by the brain function information acquisition unit 30 is indicated by a solid line, and the process performed by the brain function image generation unit 31 is indicated by a broken line.

As illustrated in FIG. 7, in the second embodiment, the brain function image generation unit 31 is configured to further generate the second brain function image 25 in which the region 27 including the measurement position 23 at which a brain function at the time of presenting a task acquired on the basis of the brain blood flow information d1 at the time of presenting the task is activated can be visually recognized. The activation of the brain function indicates that a brain blood flow rate increases in the brain region.

In the second embodiment, the brain function image generation unit 31 is configured to output the first brain function image 20 and the second brain function image 25 to be displayed in a contrastable manner. Specifically, the brain function image generation unit 31 is configured to output the first brain function image 20 and the second brain function image 25 to be superimposed and displayed. In the second embodiment, the brain function image generation unit 31 is configured to output a third brain function image 26 (refer to FIG. 8) in which the first brain function image 20 and the second brain function image 25 are superimposed and displayed to the display unit 40.

Next, with reference to FIG. 8, specific examples of the second brain function image 25 generated by the brain function measurement device 200 according to the second embodiment and the third brain function image 26 output by the brain function measurement device 200 will be described. The first matrix diagram m1, the second matrix diagram m2, and the third matrix diagram m3 acquired by the brain function information acquisition unit 30 are the same as those in the first embodiment, and thus description thereof will be omitted.

Figure 8:
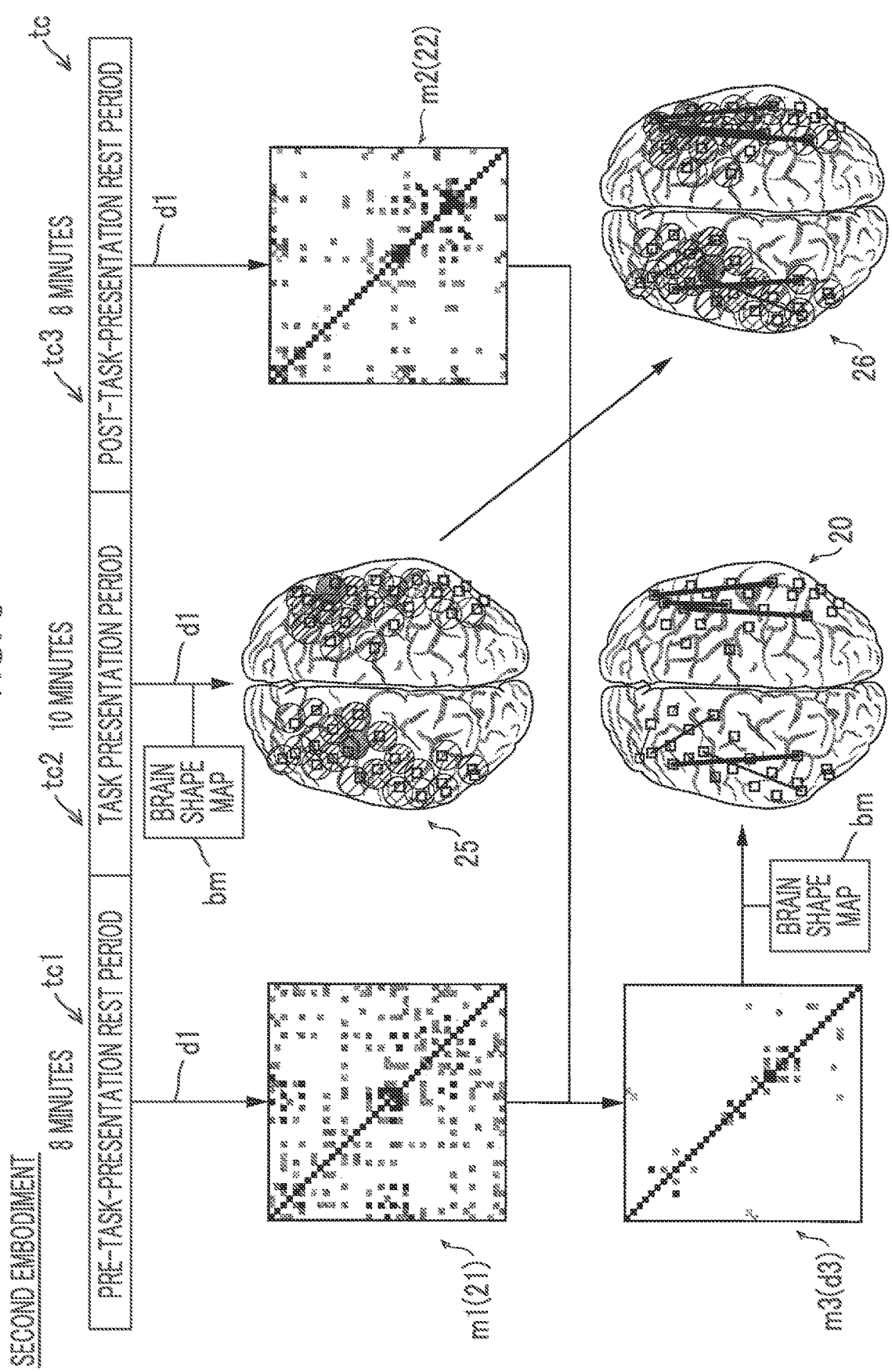
FIG. 8 is a schematic diagram for describing the correlation between brain functions, brain function correlation information, the first brain function image, and the second brain function image before and after task presentation.

As illustrated in FIG. 8, in the second embodiment, the brain function image generation unit 31 generates the second brain function image 25 on the basis of the brain blood flow information d1 in the task presentation period tc2 and the map bm indicating the shape of the brain. In the second embodiment, the brain function image generation unit 31 is configured to generate the third brain function image 26 in which the first brain function image 20 and the second brain function image 25 are superimposed on each other. In the second embodiment, the brain function image generation unit 31 is configured to output the third brain function image 26 to the brain function image display unit 40.

(Brain Function Image)

Next, with reference to FIG. 9, the first brain function image 20 and the second brain function image 25 generated by the brain function image generation unit 31 according to the second embodiment and the third brain function image 26 output to the brain function image display unit 40 by the brain function image generation unit 31 will be described. The first brain function image is the same as the first brain function image 20 generated by the brain function image generation unit 7 in the first embodiment, and thus detailed description thereof will be omitted.

FIG. 9 at (A) is a schematic diagram of the first brain function image 20 generated by the brain function image generation unit 31. FIG. 9 at (B) is a schematic diagram of the second brain function image 25 generated by the brain function image generation unit 31. FIG. 9 at (C) is a schematic diagram of the third brain function image 26 output by the brain function image generation unit 31.

As illustrated in FIG. 9 at (B), the brain function image generation unit 31 is configured to generate the second brain function image 25 in which the measurement position 23 is displayed on the map bm, and the region 27 including the measurement position 23 at which the brain function at the time of presenting the task is activated can be visually recognized. In the second embodiment, the brain function information acquisition unit 30 is configured to represent the region 27 including the measurement position 23 at which the brain function is activated with a colored circle. The brain function information acquisition unit 30 represents the degree of activation of the brain function in the region 27 including the measurement position 23 at which the brain function is activated with a difference in color of the region 27 including the measurement position 23 at which the brain function is activated. Specifically, the brain function information acquisition unit 30 is configured to display and change a color of the region 27 including the measurement position 23 at which the brain function is activated to green, orange, and red as the activation of the brain function becomes stronger.

In the example illustrated in FIG. 9 at (B), for convenience, the region 27 including the measurement position 23 at which the brain function is activated is represented by a hatched circle. In the example illustrated in FIG. 9 at (B), the brain function image generation unit 31 represents the degree of activation of the brain function with the density of hatching. That is, in the example illustrated in FIG. 9 at (B), as shown in a legend L3 indicating the degree of activation of the brain function, the brain function is activated as the hatching becomes darker. In the example illustrated in FIG. 9 at (B), the degree of activation of the brain function is displayed to be identifiable in three stages by changing the density of hatching of the region 27 including the measurement position 23 at which the brain function is activated according to the degree of activation of the brain function. That is, the activation of brain function becomes stronger in the order of a region 27a, a region 27b, and a region 27c.

As illustrated in FIGS. 9 at (A) and 9 at (B), in the second embodiment, the brain function image generation unit 31 is configured to generate the first brain function image 20 and the second brain function image 25 by making a display aspect of a positional relationship of the brain function correlation information d3 at the measurement position 23 in the first brain function image 20 different from a display aspect of the region 27 including the measurement position 23 at which the brain function at the time of presenting the task in the second brain function image 25 is activated. Specifically, the brain function image generation unit 31 is configured to display a positional relationship of the brain function correlation information d3 at the measurement position 23 in the first brain function image 20 with a connection line 24. The brain function image generation unit 31 is configured to display the region 27 including the measurement position 23 at which the brain function is activated at the time of presenting the task in the second brain function image 25 as a circular region. Therefore, in the second embodiment, the brain function image generation unit 31 can generate the first brain function image 20 and the second brain function image 25 in which display aspects of a positional relationship of the brain function correlation information d3 and the region 27 including the measurement position 23 at which the brain function at the time of task presentation is activated are different from each other by using the connection line 24 and the circular region 27.

The example illustrated in FIG. 9 at (C) is an example of the third brain function image 26 output by the brain function image generation unit 31 to the brain function image display unit 40. As illustrated in FIG. 9 at (C), the third brain function image 26 is an image in which the first brain function image 20 and the second brain function image 25 are superimposed and displayed. Therefore, in the third brain function image 26, the measurement position 23 at which the correlation of the brain function is activated before and after task presentation and the region 27 including the measurement position 23 at which the brain function is activated in the task presentation period tc2 can be checked on one image.

(Process in which Brain Function Measurement Device Generates Brain Function Image)

Figure 10:
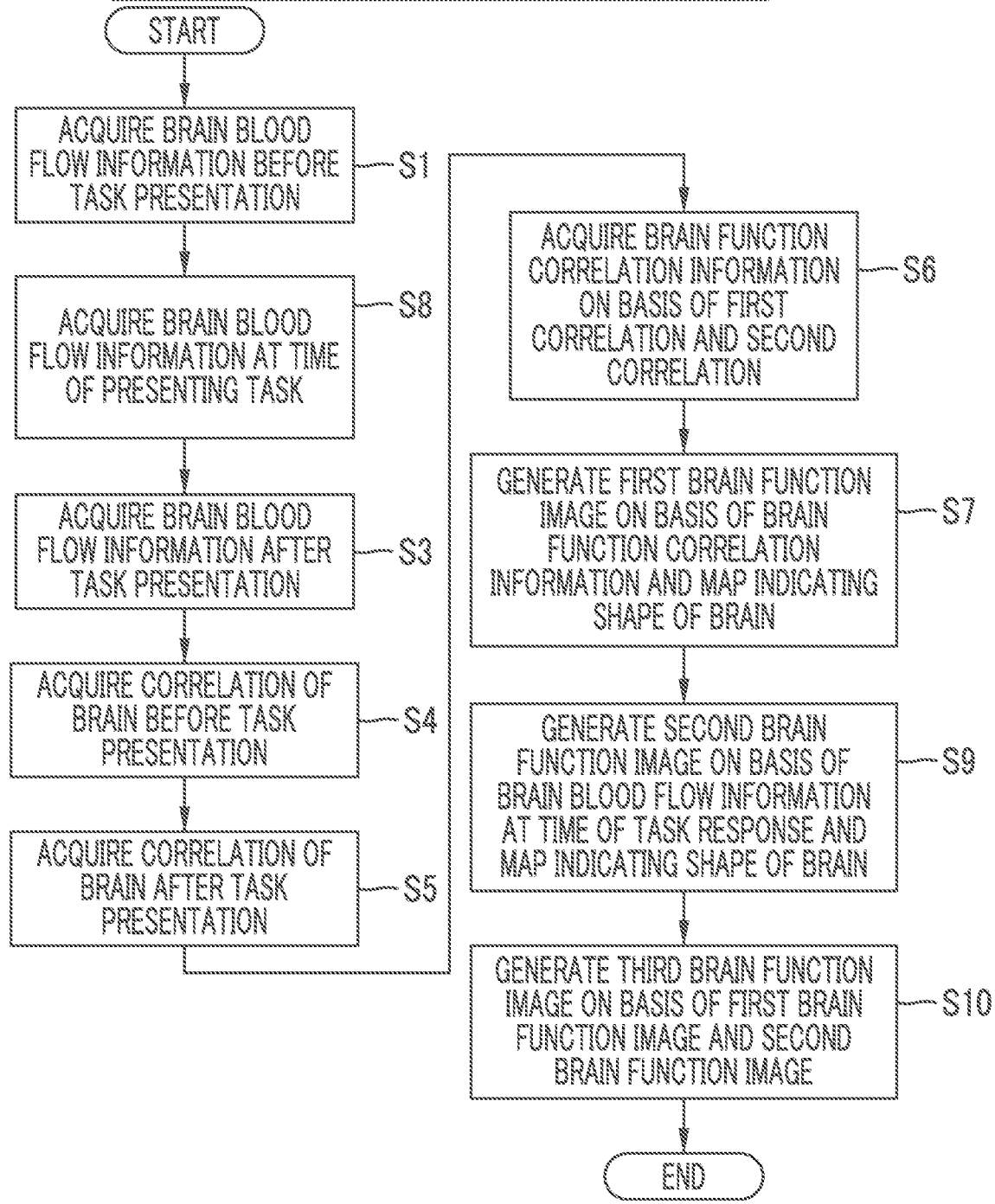
FIG. 10 is a flowchart for describing a process in which the brain function measurement device according to the second embodiment generates the first brain function image, the second brain function image, and the third brain function image.

Next, with reference to FIG. 10, a series of processes in which the brain function measurement device 200 according to the second embodiment generates the first brain function image 20, the second brain function image 25, and the third brain function image 26 will be described. Steps S1 and steps S3 to S7 are the same as the respective steps in the first embodiment, and thus detailed description thereof will be omitted.

In step S1, the control unit 3 acquires the brain blood flow information d1 before a task is presented. Thereafter, in step S8, the control unit 3 acquires the brain blood flow information d1 of the subject P in the task presentation period tc2. Thereafter, the process proceeds to step S3 to step S7, and the brain function image generation unit 31 generates the first brain function image 20. Thereafter, the process proceeds to step S9.

In step S9, the brain function image generation unit generates the second brain function image 25 on the basis of the brain blood flow information d1 in the task presentation period tc2 and the map bm indicating the shape of the brain. Thereafter, in step S10, the brain function image generation unit 31 generates a third brain function image 26 on the basis of the first brain function image 20 and the second brain function image 25, and finishes the process. The process in step S9 may be performed at any timing after the process in step S8 is performed. Any timing may be used as long as it is before the third brain function image 26 is generated.

In the second embodiment, the brain function image generation unit 31 is configured to output the third brain function image 26 to the brain function image display unit 40, and a doctor or the like can intuitively understand a change in the correlation of the brain function of the subject P due to the task presentation and the region 27 including the measurement position 23 at which the brain function is activated in the task presentation period tc2 by observing the third brain function image 26 displayed on the brain function image display unit 40.

Remaining configurations of the second embodiment are the same as those of the first embodiment.

Effects of Second Embodiment

In the second embodiment, the following effects can be achieved.

In the second embodiment, as described above, the brain function image generation unit 31 is configured to further generate the second brain function image 25 in which the region 27 including the measurement position 23 at which a brain function at the time of presenting a task acquired on the basis of the brain blood flow information d1 at the time of presenting the task is activated can be visually recognized, and the brain function image generation unit 31 is configured to output the first brain function image 20 and the second brain function image 25 to be displayed in a contrastable manner. Consequently, the first brain function image 20 and the second brain function image 25 can be contrasted and observed. As a result, the first brain function image 20 and the second brain function image 25 can be compared with each other, and thus it is possible to intuitively understand a change in the correlation of the brain function before and after task presentation and the region 27 in which the brain function at the time of presenting the task is activated.

In the second embodiment, as described above, the brain function image generation unit 31 is configured to output the first brain function image 20 and the second brain function image 25 to be superimposed and displayed. As a result, the third brain function image 26 in which the first brain function image 20 and the second brain function image 25 are superimposed can be observed. As a result, the change in the correlation of the brain function and the region 27 including the measurement position 23 at which the brain function is activated can be observed with one image, and thus positions of the region in which the correlation of the brain function has changed and the region 27 in which the brain function is activated can be easily contrasted.

In the second embodiment, as described above, the brain function image generation unit 31 is configured to generate the first brain function image 20 and the second brain function image 25 by making a display aspect of a positional relationship of the brain function correlation information d3 at the measurement position 23 in the first brain function image 20 different from a display aspect of the region 27 including the measurement position 23 at which the brain function is activated at the time of presenting the task in the second brain function image 25. Consequently, since a display aspect of the positional relationship of the brain function correlation information d3 at the measurement position 23 in the first brain function image 20 is different from a display aspect of the region 27 including the measurement position 23 at which the brain function at the time of presenting the task in the second brain function image 25 is activated, even in a case where the first brain function image 20 and the second brain function image 25 are contrasted, it is possible to differentiate a positional relationship of the brain function correlation information d3 at the measurement position 23 from the region 27 including the measurement position 23 at which the brain function at the time of presenting the task is activated. As a result, for example, even in a case where the first brain function image 20 and the second brain function image 25 are superimposed and displayed, a positional relationship of the brain function correlation information d3 and the region 27 including the measurement position 23 at which the brain function is activated can be observed in a state of being distinguished from each other, and thus it is possible to improve the visibility of the images when a doctor or the like evaluates the brain function of the subject P.

In the second embodiment, as described above, the brain function measurement device 200 includes the brain blood flow information acquisition unit 1 that acquires the brain blood flow information d1 of the subject P, and the brain function image generation unit 31 that generates the first brain function image 20 indicating a relative change in a correlation between respective portions of the brain based on the brain blood flow information d1 before and after presentation of a task and the second brain function image 25 indicating the region 27 in which the brain function based on the brain blood flow information d1 at the time of presenting the task is activated, and outputs the first brain function image 20 and the second brain function image 25 to be displayed in a contrastable manner. Consequently, the first brain function image 20 and the second brain function image 25 can be contrasted and observed. As a result, it is possible to compare a change in the correlation of the brain function before and after presentation of the task with the region 27 including the measurement position 23 at which the brain function is activated at the time of presenting the task, and thus to provide the brain function measurement device 200 enabling the change in the correlation of the brain function before and after presentation of the task and activation of the brain function at the time of presenting the task to be intuitively understood. Since a change in the correlation of brain function before and after the task is presented and activation of the brain function at the time of presenting the task can be contrasted and observed, findings such as the change in the correlation of the brain function due to the presentation of the task can be obtained.

Remaining effects of the second embodiment are the same as those of the first embodiment.

Third Embodiment

Next, a brain function measurement device 300 (refer to FIG. 1) according to a third embodiment of the present invention will be described with reference to FIGS. 1 and 11. In the second embodiment, the first brain function image 20 and the second brain function image 25 are output to be superimposed and displayed in a contrastable manner. However, in the third embodiment, a brain function image generation unit 32 is configured to output the first brain function image 20 and the second brain function image 25 to the brain function image display unit 40 to be arranged and displayed. The same constituent as that in the first embodiment is given the same reference numeral, and description thereof will not be repeated.

Figure 11:
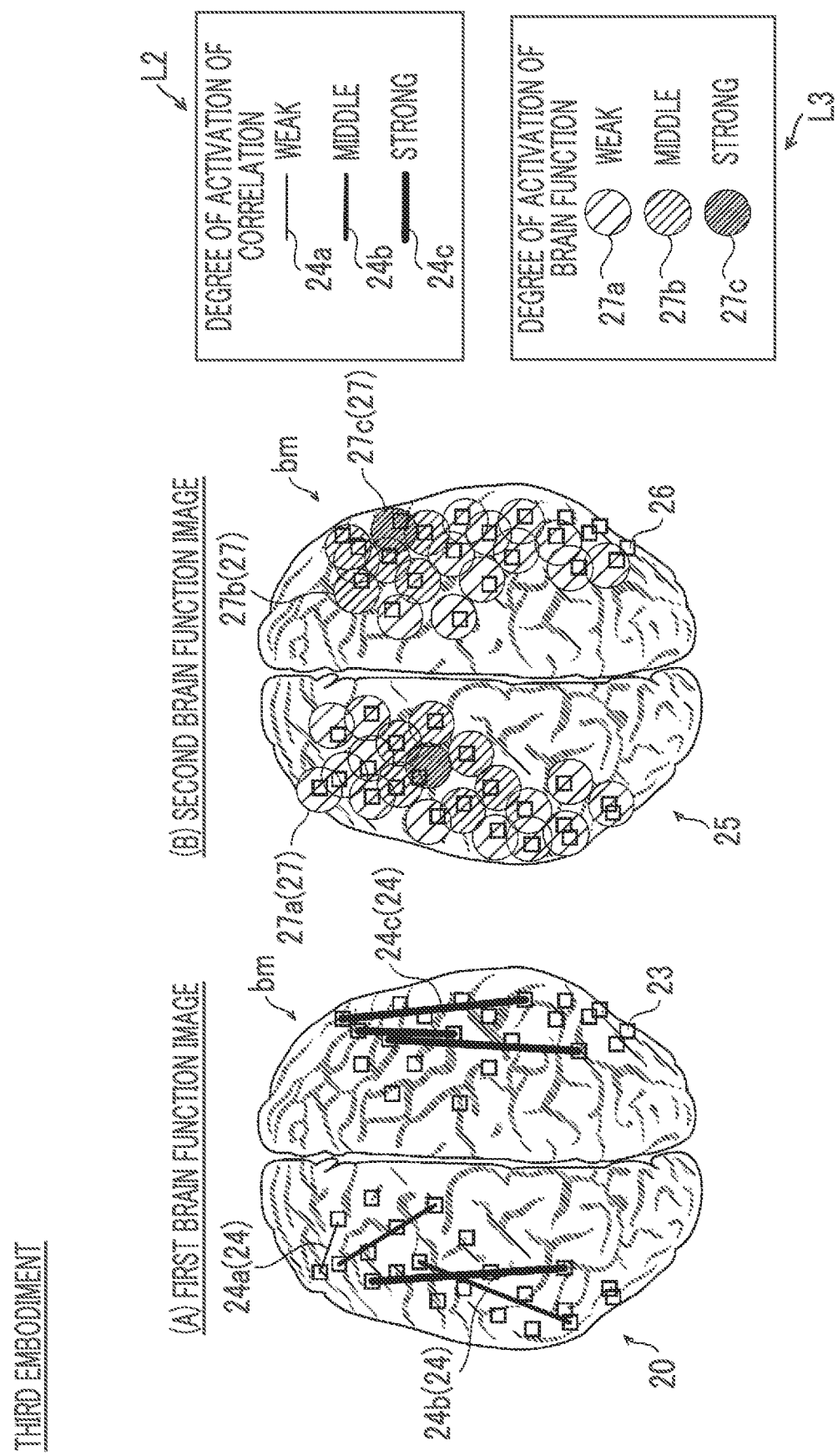
FIG. 11 at (A) and (B) are respective schematic diagrams of a first brain function image and a second brain function image displayed on a brain function image display unit by a brain function measurement device according to a third embodiment.

As illustrated in FIG. 11, the brain function image generation unit 32 according to the third embodiment is configured to output the first brain function image 20 and the second brain function image 25 to be arranged and displayed. In the example illustrated in FIG. 11, the first brain function image 20 and the second brain function image 25 are arranged and displayed. The first brain function image 20 and the second brain function image 25 may be arranged horizontally or vertically as long as the images have the same orientation. The first brain function image 20 and the second brain function image 25 may be arranged and displayed on the same screen, or the first brain function image 20 and the second brain function image 25 displayed on different screens may be arranged and displayed.

Remaining configurations of the third embodiment are the same as those of the first and second embodiments.

Effects of Third Embodiment

In the third embodiment, the following effects can be achieved.

In the third embodiment, as described above, the brain function image generation unit 32 is configured to output the first brain function image 20 and the second brain function image 25 to be arranged and displayed. Consequently, each image can be observed in a state where the first brain function image 20 and the second brain function image 25 are arranged. As a result, it is possible to observe the respective images side by side, and thus it is easy to contrast the overall distribution of a region in which a correlation of the brain function has changed with the overall distribution of the region 27 in which the brain function is activated.

Remaining effects of the third embodiment are the same as those of the first and second embodiments.

Modification Examples

It should be noted that the embodiments disclosed this time are exemplary in all respects and are not considered to be restrictive. The scope of the present invention is shown not by the description of the above embodiments but by the scope of claims, and further includes all changes (modification examples) within the meaning and the scope equivalent to the scope of claims.

For example, in the first to third embodiments, as an example, the configuration has been described in which the brain function image generation unit 7 (the brain function image generation unit 31, the brain function image generation unit 32) generates the first brain function image 20 in which the degree of activation of a correlation of a brain function can be identified by changing a width of the connection line 24, but the present invention is not limited thereto. For example, the brain function image generation unit 7 may be configured to generate the first brain function image 20 in which the degree of activation of the correlation of the brain function can be identified by changing a color of the connection line 24. In a case where the first brain function image 20 in which the degree of activation of the brain function correlation can be identified by changing a color of the connection line 24 is generated, the connection line 24 may be displayed green, yellow, and red, for example, as activation of the correlation of the brain function becomes stronger. As long as the degree of activation of the correlation of the brain function can be identified in the first brain function image 20, the connection line 24 may be displayed according to any aspect.

In the first to third embodiments, as an example, the configuration in which an MRI device is used as the brain shape information acquisition device 6 has been described, but the present invention is not limited thereto. For example, a tomographic imaging device (CT device) may be used as the brain shape information acquisition device 6. Any device may be used as the brain shape information acquisition device 6 as long as the map bm indicating a shape of the brain of the subject P can be obtained.

In the first to third embodiments, in each matrix diagram (the first matrix diagram m1, the second matrix diagram m2, and the third matrix diagram m3), a difference in activation of the correlation of the brain function is indicated by a color difference, but the present invention is not limited thereto. For example, the difference in activation of the correlation of the brain function may be indicated by a difference in hatching as illustrated in FIG. 4. Any display method may be used as long as activation of the correlation of the brain function can be checked.

In the first to third embodiments, an example of the configuration in which the brain function measurement device 100 (the brain function measurement device 200, the brain function measurement device 300) acquires the brain blood flow information d1 by using the NIRS has been described, but the present invention is not limited thereto. For example, the brain function measurement device 100 (the brain function measurement device 200, the brain function measurement device 300) acquires the brain blood flow information d1 by functional magnetic resonance imaging (fMRI), single photon emission computed tomography (SPECT), or the like.

Figure 12:
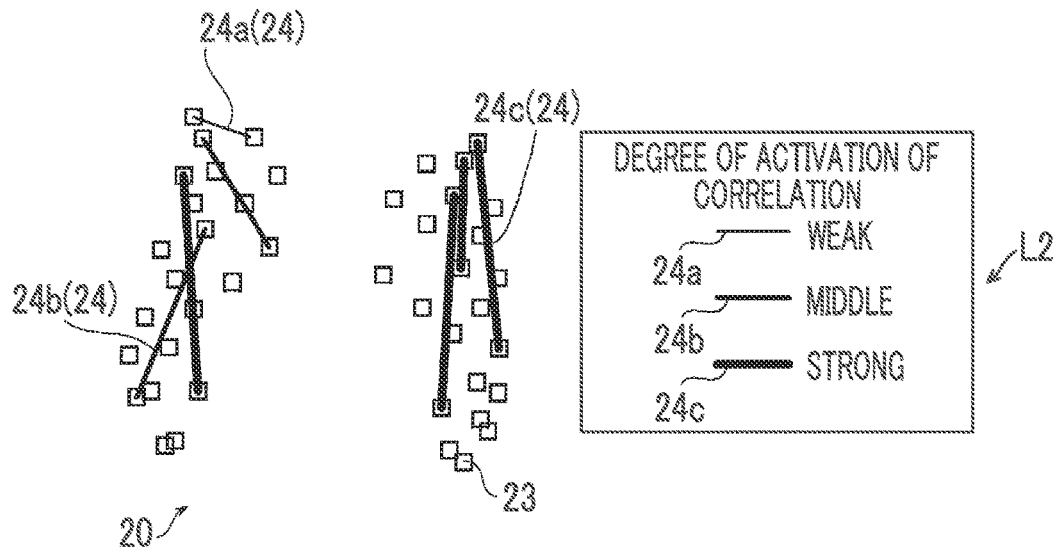
FIG. 12 is a schematic diagram of a first brain function image generated by a brain function measurement device according to a first modification example.

In the first to third embodiments, the example has been described in which the brain shape information acquisition unit 2 is provided, and the brain function image generation unit 7 (the brain function image generation unit 31, the brain function image generation unit 32) generates the first brain function image 20 by using the brain function correlation information d3 and the map bm indicating the shape of the brain, but the present invention is not limited thereto. For example, a configuration in which the brain shape information acquisition unit 2 is not provided may be used. In a case where the brain shape information acquisition unit 2 is not provided, the brain function image generation unit 7 (the brain function image generation unit 31, the brain function image generation unit 32) may be configured to generate the first brain function image 20 by using the measurement position 23 for the brain blood flow information d1 and the brain function correlation information d3 as illustrated in FIG. 12, for example.

Figure 13:
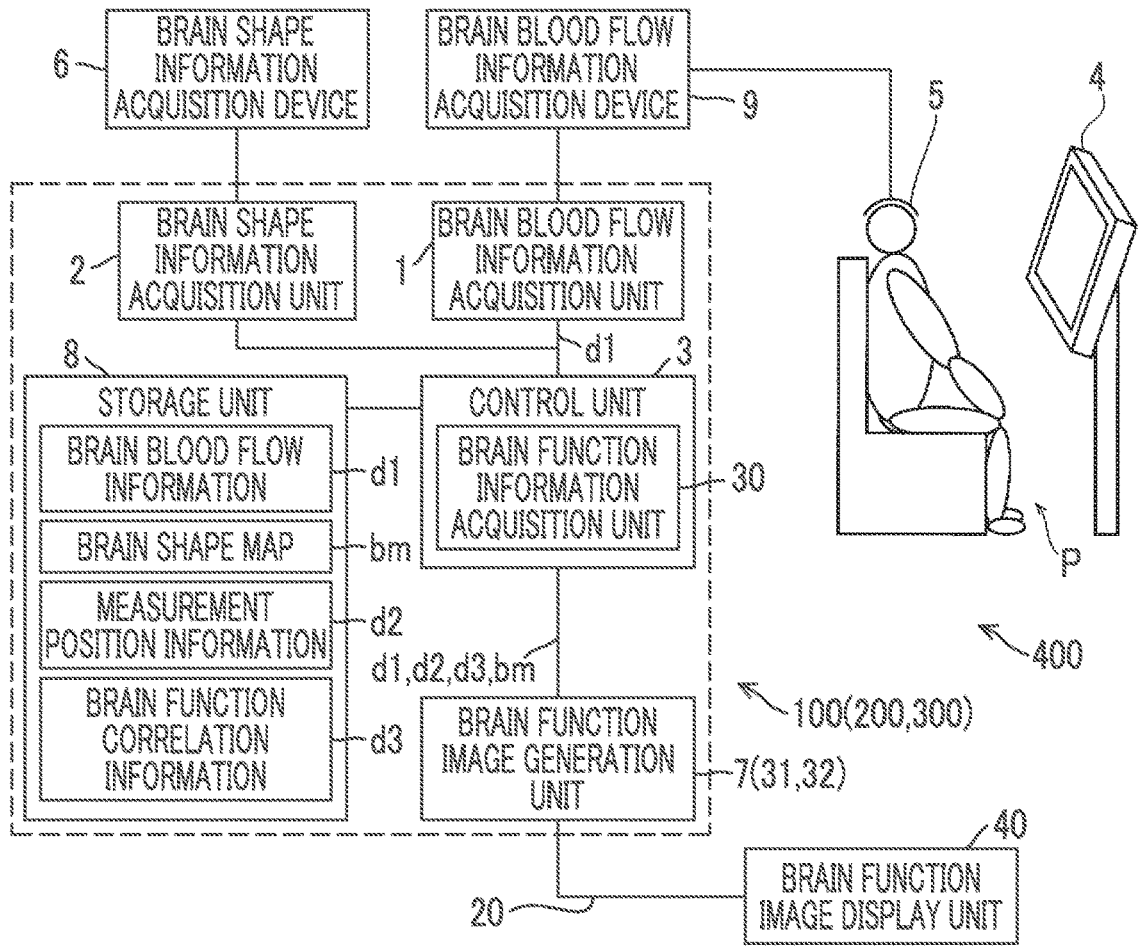
FIG. 13 is a schematic diagram illustrating the overall structure of a brain function measurement device according to a second modification example.

In the first to third embodiments, as an example, the configuration of the brain blood flow information acquisition device in which the brain blood flow information acquisition unit 1 acquires the brain blood flow information d1 has been described, but the present invention is not limited thereto. For example, as illustrated in FIG. 13, a brain function measurement system 400 including the brain function measurement device 100 (the brain function measurement device 200, the brain function measurement device 300), a brain blood flow information acquisition device 9, and a brain shape information acquisition device 6 may be configured. That is, the brain function measurement device 100 (the brain function measurement device 200, the brain function measurement device 300) does not have to include the brain blood flow information acquisition device 9. In a case where the brain function measurement system 400 is configured, the brain blood flow information acquisition unit 1 may be configured as an input/output interface for acquiring the brain blood flow information d1 acquired by the brain blood flow information acquisition device 9.

Figure 14:
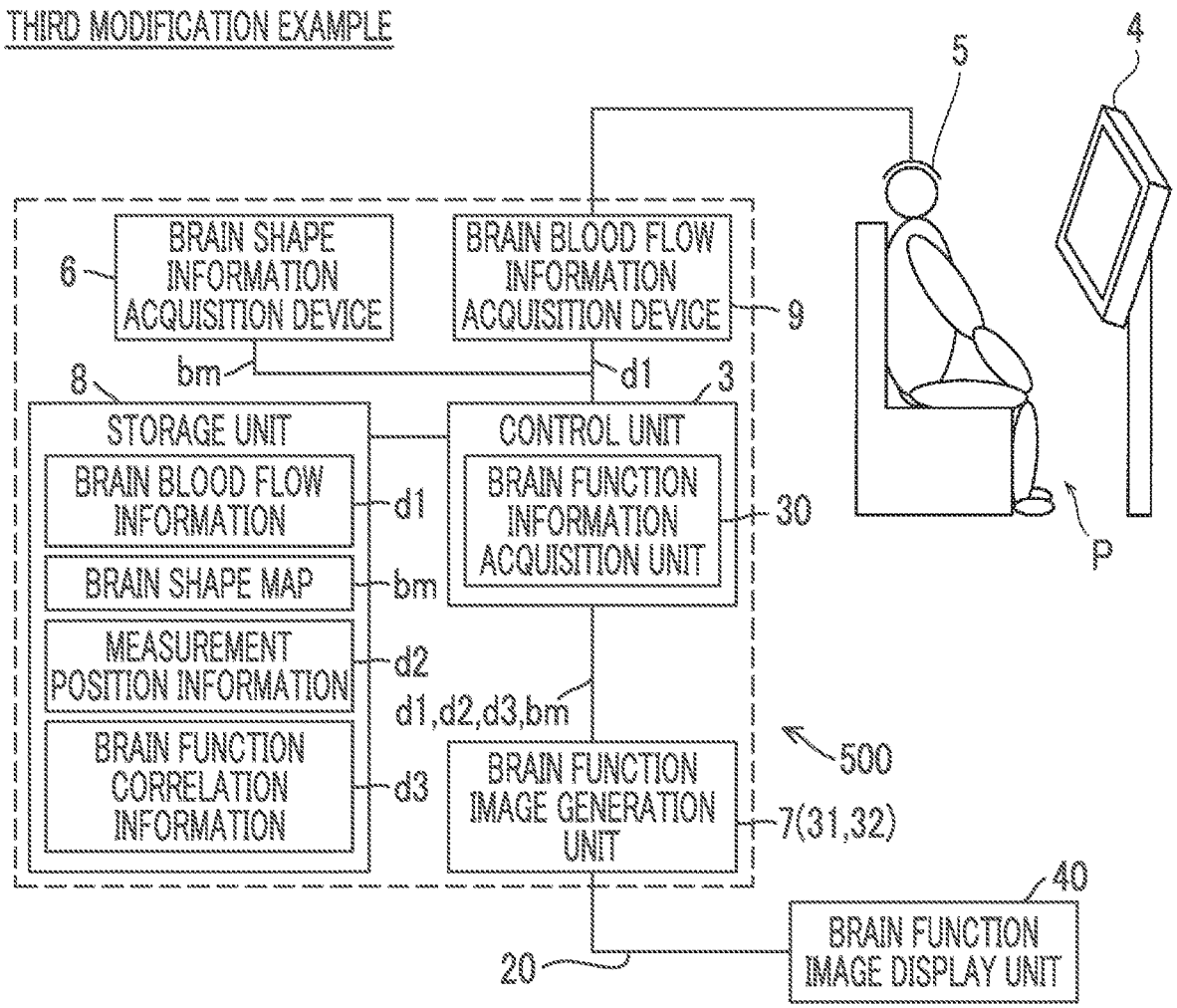
FIG. 14 is a schematic diagram illustrating the overall structure of a brain function measurement device according to a third modification example.

In the first to third embodiments, as an example, the configuration in which the brain blood flow information acquisition unit 1 is the brain blood flow information acquisition device 9 and the brain shape information acquisition unit 2 is an input/output interface has been described, but the present invention is not limited thereto. For example, as illustrated in FIG. 14, a brain function measurement device 500 may be configured to include a brain blood flow information acquisition device 9, a brain shape information acquisition device 6, and a control unit 3. In a case where the brain function measurement device 500 includes the brain blood flow information acquisition device 9 and the brain shape information acquisition device 6, the control unit 3 may be configured to receive the brain blood flow information d1 and the map bm indicating a shape of the brain from the brain blood flow information acquisition device 9 and the brain shape information acquisition device 6.

In the second embodiment, as an example, the configuration has been described in which the brain function image generation unit 31 outputs the third brain function image 26 in which the first brain function image 20 and the second brain function image 25 are superimposed to the brain function image display unit 40, but the present invention is not limited thereto. For example, the brain function image generation unit 31 may be configured to output the first brain function image 20 and the second brain function image 25 to the brain function image display unit 40, and to display the first brain function image 20 and the second brain function image 25 in a superimposed manner on the brain function image display unit 40.

Figure 15:
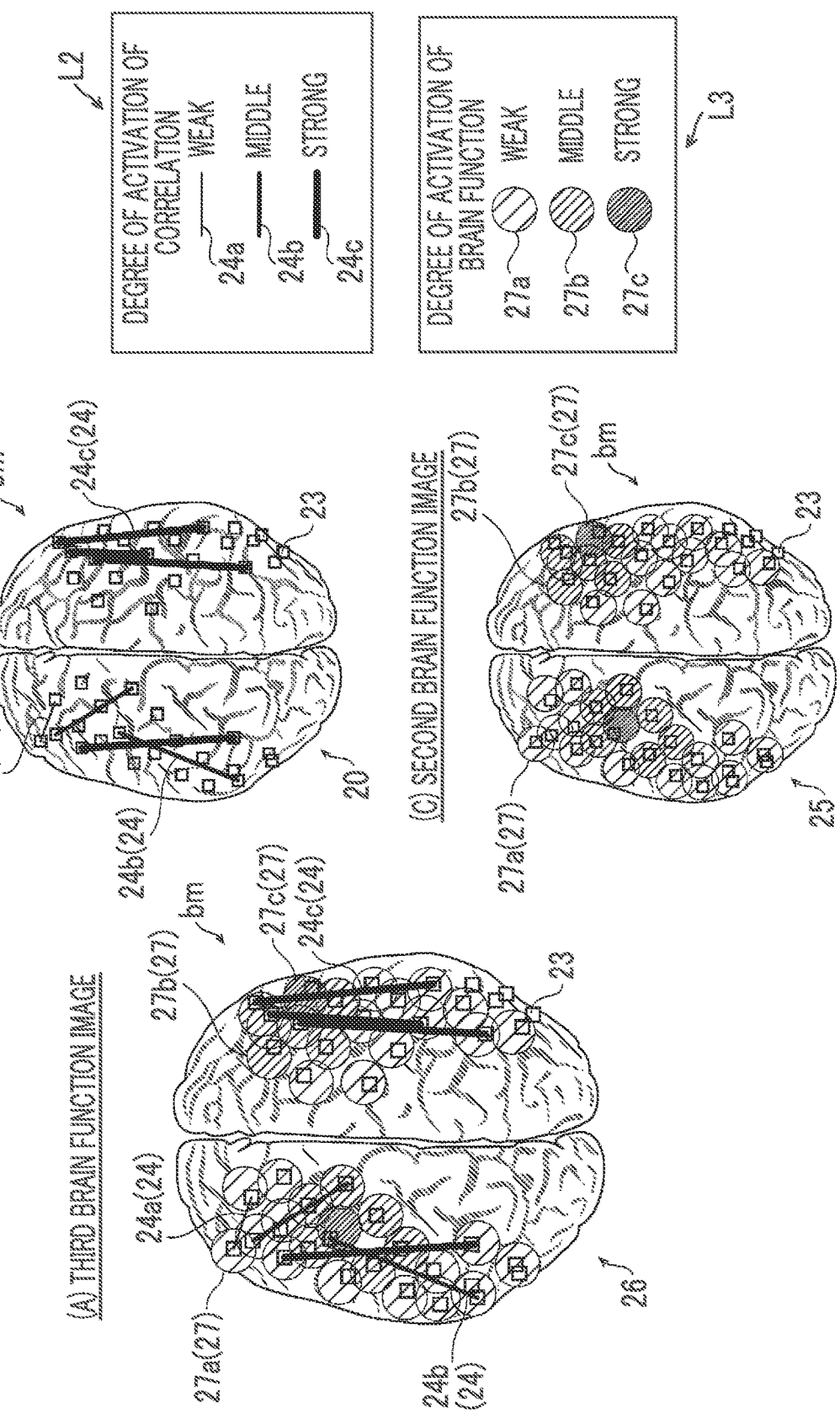
FIG. 15 at (A), (B), and (C) are respective schematic diagrams of a third brain function image, a first brain function image, and a second brain function image that are output by a brain function measurement device according to a modified example of the second embodiment to a brain function image display unit.

In the second embodiment, as an example, the configuration has been described in which the brain function image generation unit 31 outputs the third brain function image 26 in which the first brain function image 20 and the second brain function image 25 are superimposed to the brain function image display unit 40, but the present invention is not limited thereto. For example, as illustrated in FIG. 15, the brain function image generation unit 31 may be configured to output the first brain function image 20, the second brain function image 25, and the third brain function image 26 to be arranged and displayed to the brain function image display unit 40.

In the first to third embodiments, the example has been described in which each of the pre-task-presentation rest period tc1 and the post-task-presentation rest period tc3 is 8 minutes and the task presentation period tc2 is minutes, but the present invention is not limited thereto. Each of the pre-task-presentation rest period tc1, the task presentation period tc2, and the post-task-presentation rest period tc3 may be set to any time.

In the first embodiment, as an example, the configuration in which the brain blood flow information acquisition unit 1 acquires the brain blood flow information d1 in the task presentation period tc2 has been described, but the present invention is not limited thereto. For example, the brain blood flow information acquisition unit 1 does not have to acquire the brain blood flow information d1 in the task presentation period tc2.

In the first to third embodiments, as an example, the configuration has been described in which the brain function information acquisition unit 30 acquires the brain function correlation information d3 by acquiring a difference value between the first correlation 21 and the second correlation 22, but the present invention is not limited thereto. For example, the brain function information acquisition unit 30 may be configured to acquire the brain function correlation information d3 by acquiring a ratio between the first correlation 21 and the second correlation 22. The brain function information acquisition unit 30 may have any configuration as long as it is possible to learn a relative change in the correlation of the brain functions before and after task presentation.

In the first to third embodiments, the configuration has been described in which the brain function image generation unit 7 (the brain function image generation unit 31, the brain function image generation unit 32) generates the first brain function image 20 in which the degree of activation of the correlation of the brain function can be identified in three stages, but the present invention is not limited thereto. The degree of activation of the correlation of the brain function may be represented in any number of stages.

In the second and third embodiments, the configuration has been described in which the brain function image generation unit 31 (brain function image generation unit 32) generates the second brain function image 25 in which the degree of activation of the region 27 in which the brain function at the time of presenting the task is activated can be identified in three stages, but the present invention is not limited thereto. The degree of activation of the region 27 in which the brain function at the time of presenting the task is activated may be represented in any number of stages.

REFERENCE SIGNS LIST

1 Brain blood flow information acquisition unit
2 Brain shape information acquisition unit
7, 31, 32 Brain function image generation unit
20 First brain function image
23 Measurement position
24 Connection line
25 Second brain function image
30 Brain function information acquisition unit
100, 200, 300, 500 Brain function measurement device
bm Map indicating shape of brain
d1 Brain blood flow information
d3 Brain function correlation information
P Subject

The invention claimed is:

1. A brain function measurement device comprising:
at least one processor configured to:
acquire brain blood flow information of a single subject;
acquire brain function correlation information indicating a relative change in a correlation between respective portions of a brain acquired on the basis of the brain blood flow information measured in a plurality of portions of the brain of the single subject before and after a task is presented;
generate a first brain function image in which each measurement position for the brain blood flow information and the measurement position at which the correlation acquired on the basis of the brain function correlation information has changed are visually recognizable; and acquire a map indicating a shape of the brain of the single subject, wherein the at least one processor is further configured to generate the first brain function image in which the measurement position is displayed on the map and a position of the brain function correlation information on the map is visually recognizable, wherein the at least one processor is further configured to generate the first brain function image in which display aspects of the measurement positions are different from each other on the basis of an amount of change in the correlation, and wherein the at least one processor is further configured to connect the measurement positions at which the correlation of the brain function of the single subject is activated via a connection line in a state in which the activation of the correlation of the brain function of the single subject exceeds a predetermined threshold value.

2. The brain function measurement device according to claim 1, wherein the at least one processor is further configured to generate the first brain function image in which the measurement positions between two points at which the correlation acquired on the basis of the brain function correlation information has changed are visually recognizable.

3. The brain function measurement device according to claim 2, wherein the at least one processor is further configured to generate the first brain function image in which the measurement positions at which the correlation is activated before and after the task is presented are displayed by being connected to each other via the connection line on the map.

4. The brain function measurement device according to claim 3, wherein the at least one processor is further configured to generate the first brain function image in which a degree of activation of the correlation in the first brain function image is identifiable before and after the task is presented.

5. The brain function measurement device according to claim 4, wherein at least one processor is further configured to generate the first brain function image in which the degree of activation of the correlation is identifiable by changing at least one of a color or a width of the connection line.

6. The brain function measurement device according to claim 1, wherein the at least one processor is further configured to acquire the brain function correlation information by acquiring a difference value in the correlation before and after the task is presented.

7. The brain function measurement device according to claim 1, wherein the at least one processor is further configured to further generate a second brain function image in which a region including the measurement position where the brain function at the time of presenting the task acquired on the basis of the brain blood flow information at the time of presenting the task is activated is visually recognizable, and wherein the at least one processor is further configured to output the first brain function image and the second brain function image to be displayed in a contrastable manner.

8. The brain function measurement device according to claim 7, wherein at least one processor is further configured to output the first brain function image and the second brain function image to be superimposed and displayed.

9. The brain function measurement device according to claim 7, wherein at least one processor is further configured to output the first brain function image and the second brain function image to be arranged and displayed.

10. The brain function measurement device according to claim 7, wherein at least one processor is further configured to generate the first brain function image and the second brain function image by making a display aspect of a positional relationship of the brain function correlation information at the measurement position in the first brain function image different from a display aspect of a region including the measurement position at which the brain function at the time of presenting the task in the second brain function image is activated.

11. A brain function measurement device comprising:
at least one processor configured to:
acquire brain blood flow information of a single subject;
generate a first brain function image indicating a relative change in a correlation between respective portions of a brain of the single subject based on the brain blood flow information before and after a task is presented and a second brain function image indicating a region in which a brain function of the single subject based on the brain blood flow information at the time of presenting the task is activated, and output the first brain function image and the second brain function image to be displayed in a contrastable manner; and
acquire a map indicating a shape of the brain of the single subject,
wherein the at least one processor is further configured to generate the first brain function image in which each measurement position for the brain blood flow information is displayed on the map and a position of the brain function correlation information indicating the relative change in the correlation on the map is visually recognizable,
wherein the at least one processor is further configured to generate the first brain function image in which display aspects of the measurement positions are different from each other on the basis of an amount of change in the correlation, and
wherein the at least one processor is further configured to connect the measurement positions at which the correlation of the brain function of the single subject is activated via a connection line in a state in which the activation of the correlation of the brain function of the single subject exceeds a predetermined threshold value.

12. The brain function measurement device according to claim 1, wherein the measurement position is represented by a shape on the first brain function image.

13. The brain function measurement device according to claim 7, wherein the measurement position is represented by a shape on both the first brain function image and the second brain function image.

14. The brain function measurement device according to claim 11, wherein the measurement position is represented by a shape on both the first brain function image and the second brain function image.

15. The brain function measurement device according to claim 1, further comprising a plurality of probes configured to transmit light on the single subject and the at least one processor is further configured to acquire the brain blood flow information of the single subject based on light incident to the plurality of probes.

16. The brain function measurement device according to claim 11, further comprising a plurality of probes configured to transmit light on the single subject and the at least one processor is further configured to acquire the brain blood flow information of the single subject based on light incident to the plurality of probes.

\* \* \* \* \*